Figure 1:
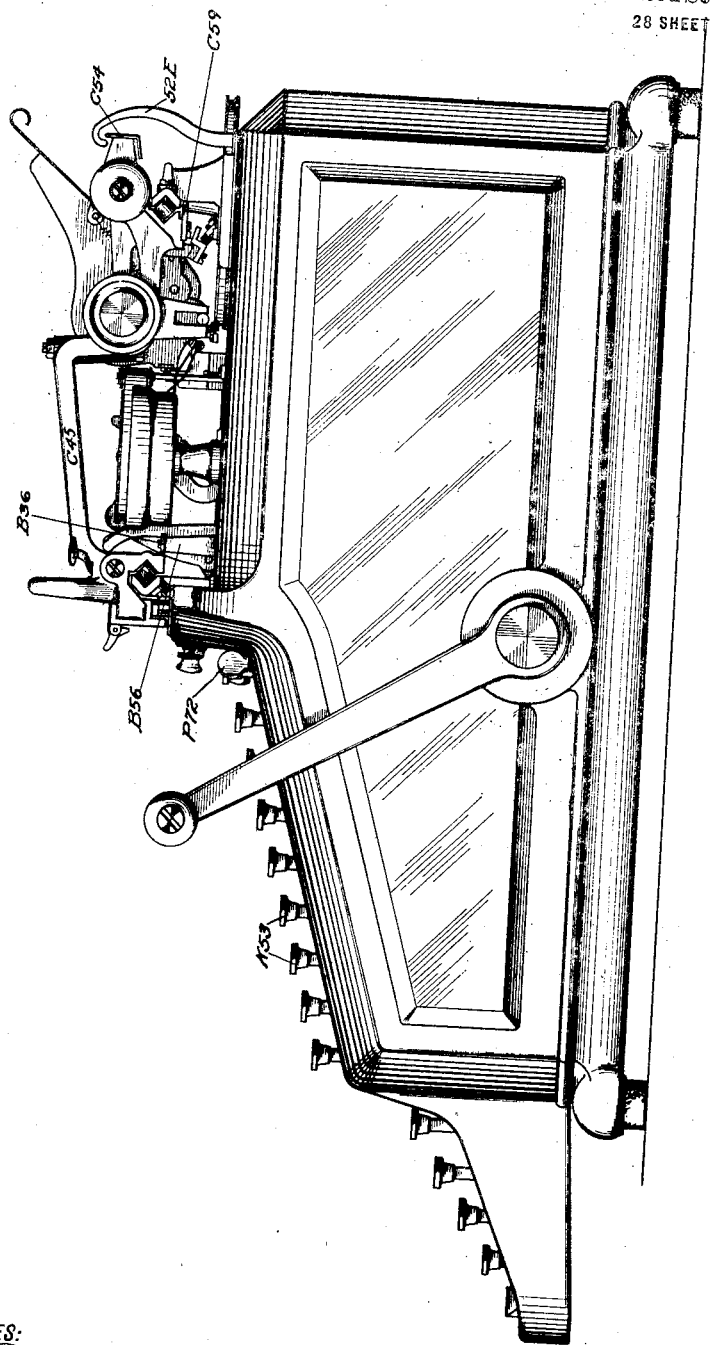

H. ELLIS.
COMBINED ADDING MACHINE AND TYPE WRITER.
APPLICATION FILED DEC. 30, 1908.

1,197,276.

Patented Sept. 5, 1916.
28 SHEETS—SHEET 2.

WITNESSES
John T. L. Duncan
Frederick Schultz

INVENTOR
Halcolm Ellis

H. ELLIS.
COMBINED ADDING MACHINE AND TYPE WRITER.
APPLICATION FILED DEC. 30, 1908.

Patented Sept. 5, 1916.
28 SHEETS—SHEET 4.

WITNESSES:

INVENTOR
Halcolm Ellis

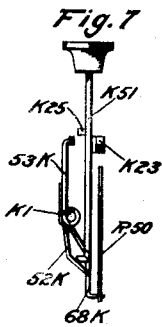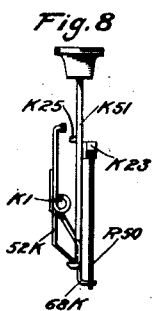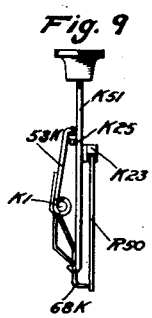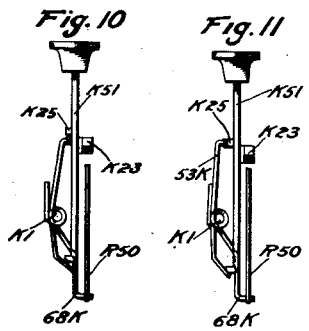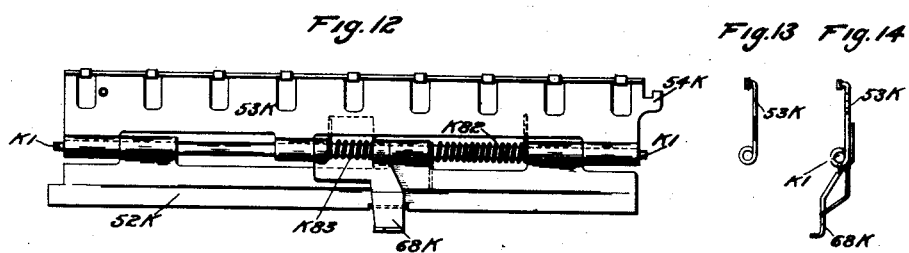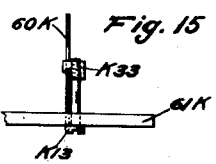

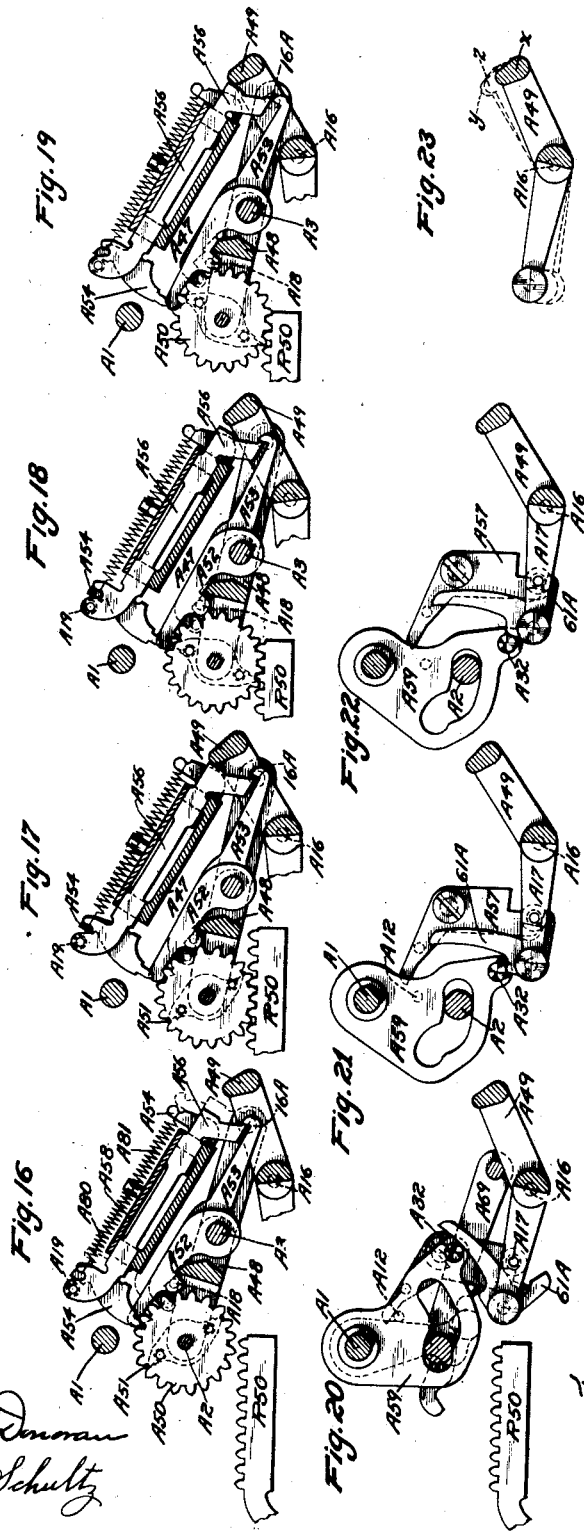

H. ELLIS.
COMBINED ADDING MACHINE AND TYPE WRITER.
APPLICATION FILED DEC. 30, 1908.

1,197,276.

Patented Sept. 5, 1916.
28 SHEETS—SHEET 8.

WITNESSES:

INVENTOR

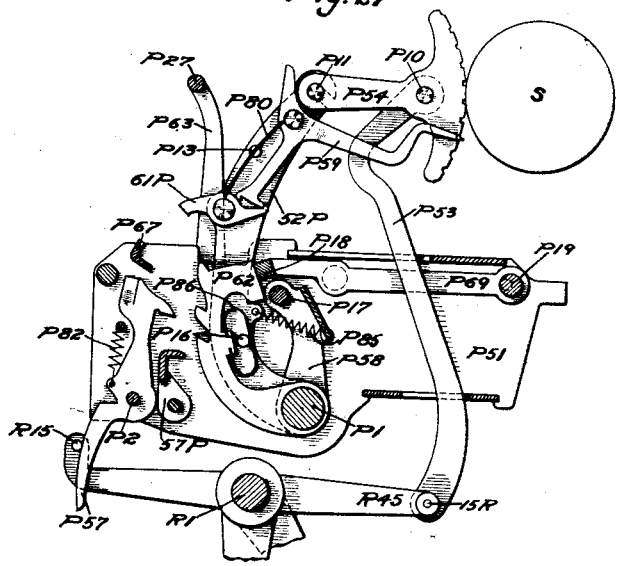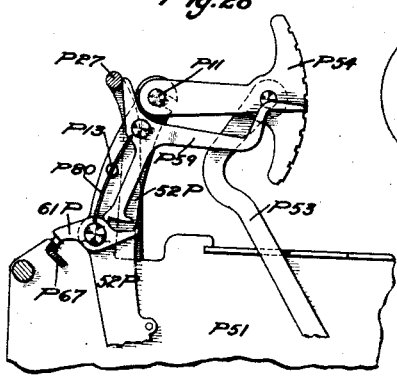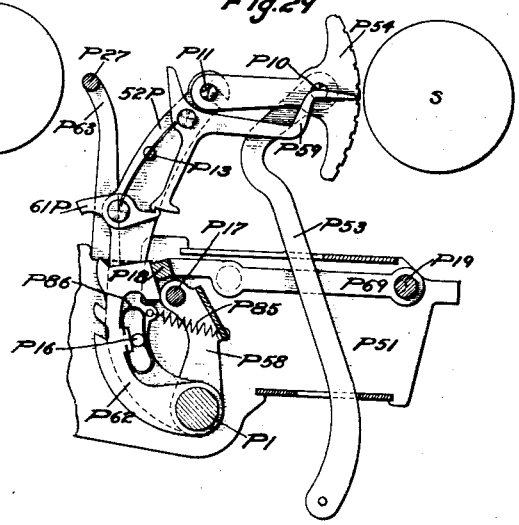

H. ELLIS.
COMBINED ADDING MACHINE AND TYPE WRITER.
APPLICATION FILED DEC. 30, 1908.
1,197,276.
Patented Sept. 5, 1916.
28 SHEETS—SHEET 10.
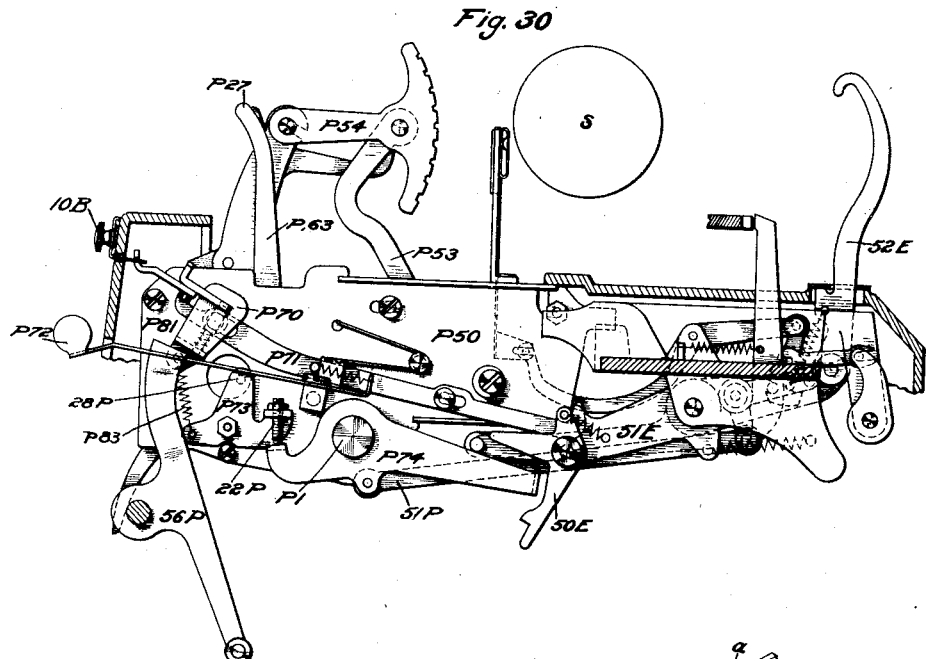
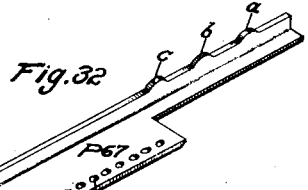
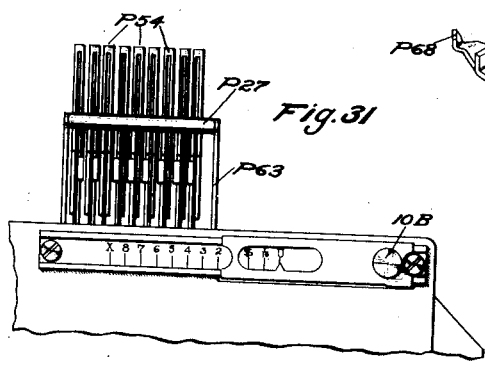
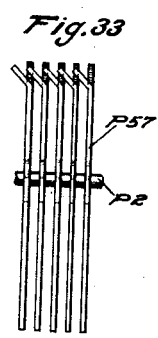
WITNESSES
INVENTOR H. ELLIS.
COMBINED ADDING MACHINE AND TYPE WRITER.
APPLICATION FILED DEC. 30, 1908.
1,197,276.
Patented Sept. 5, 1916.
28 SHEETS—SHEET 12.
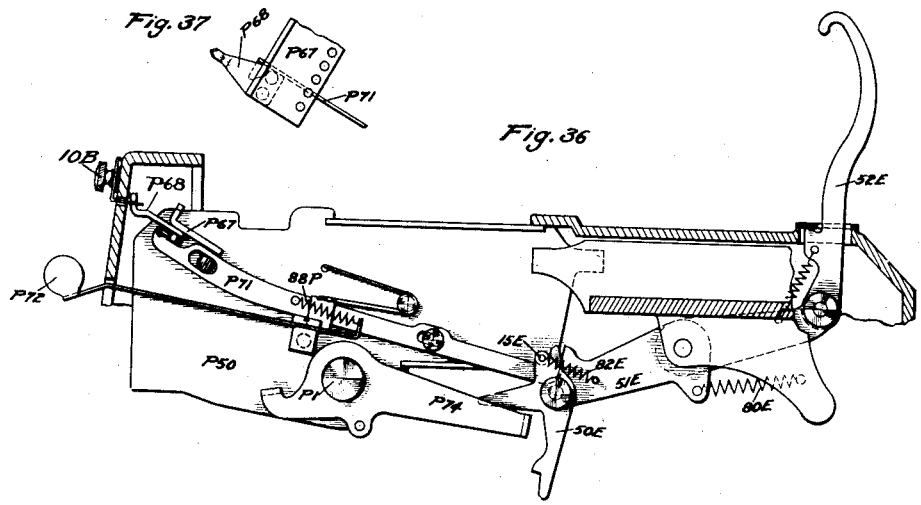
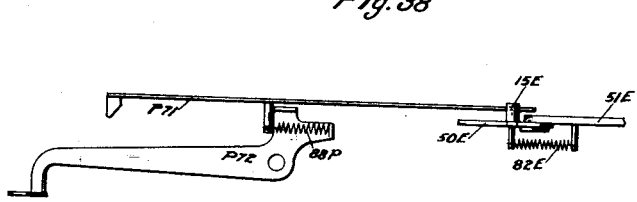
WITNESSES:
INVENTOR

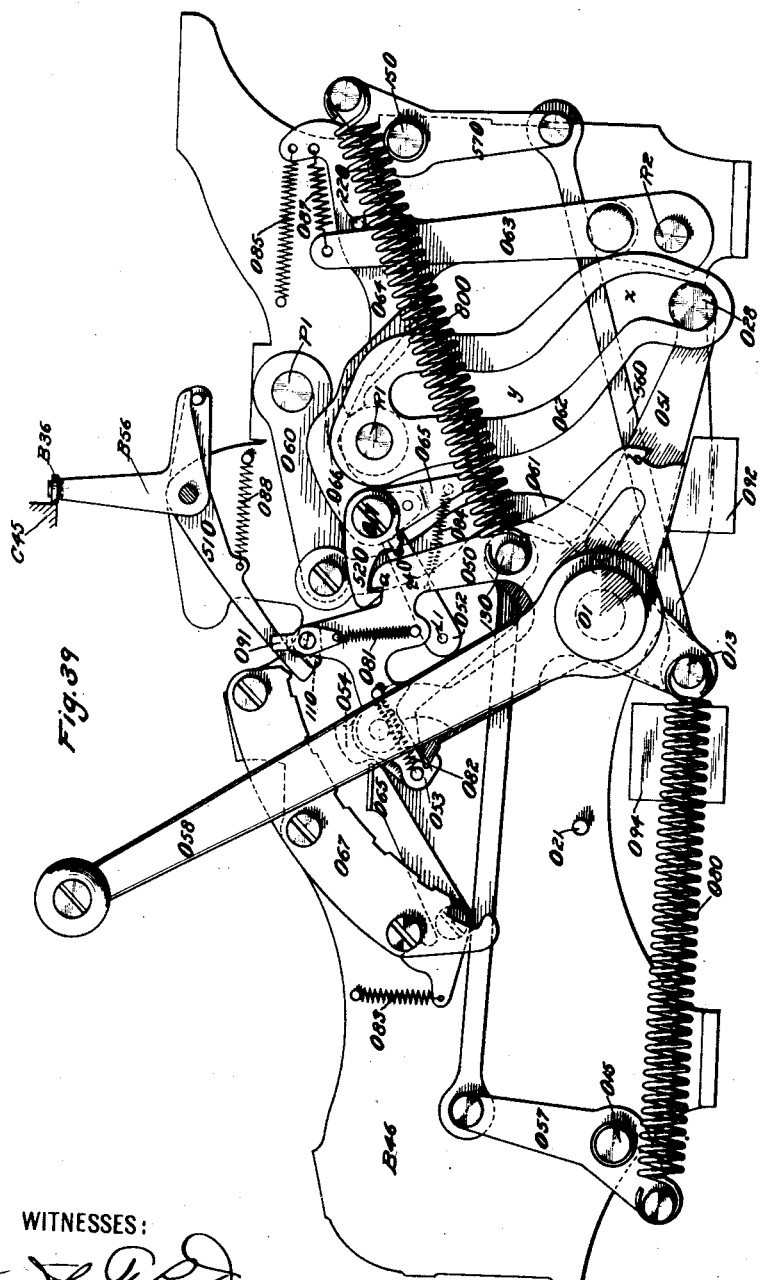

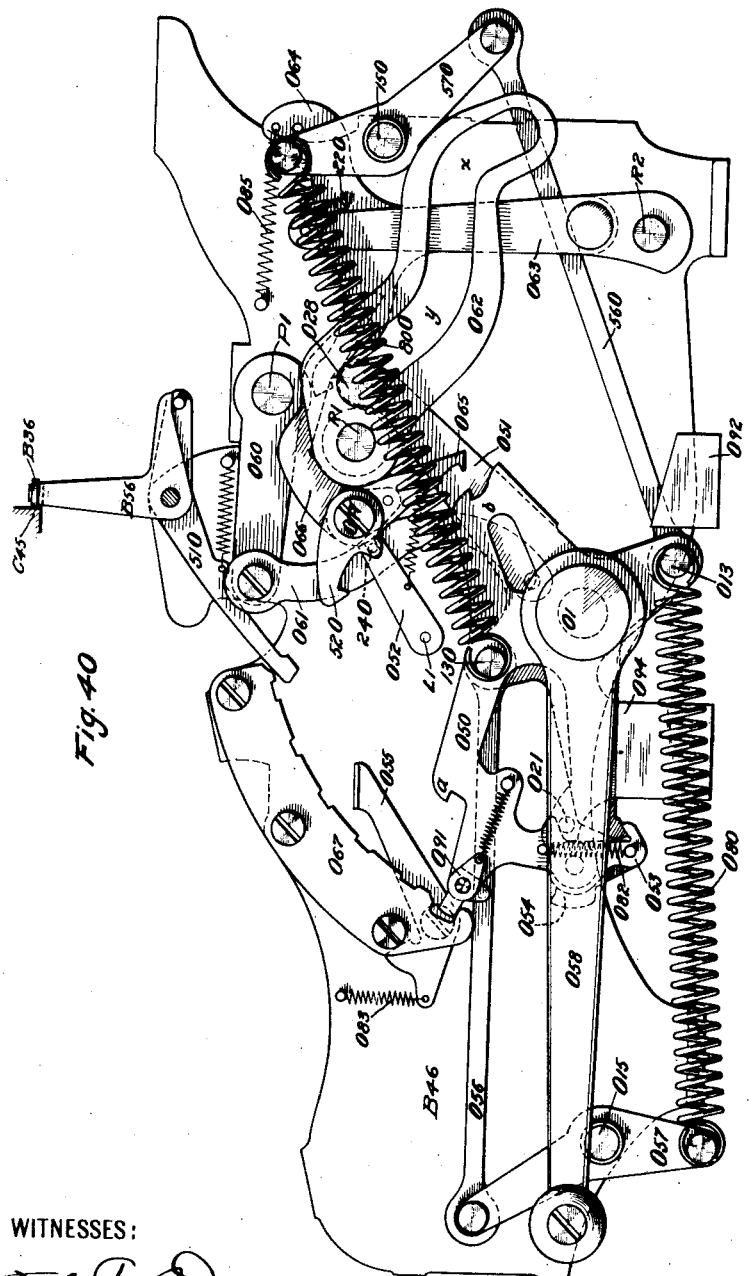

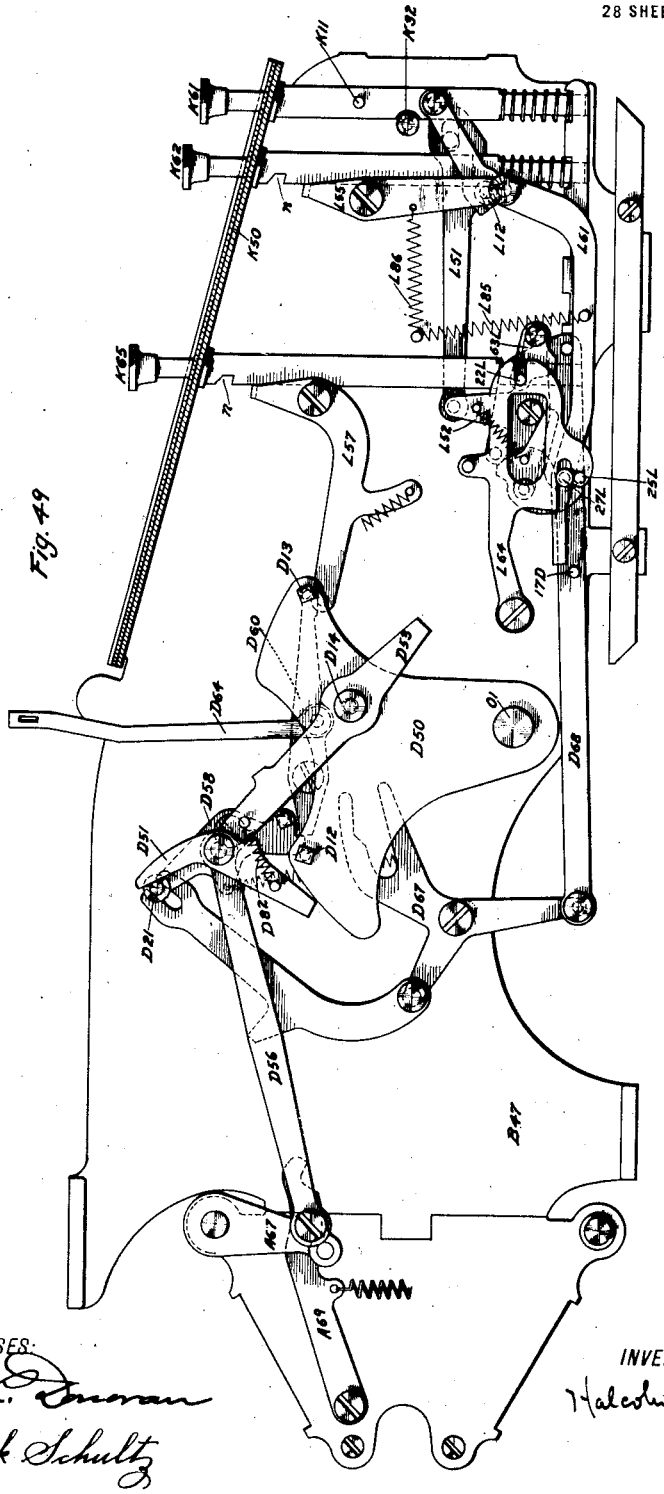

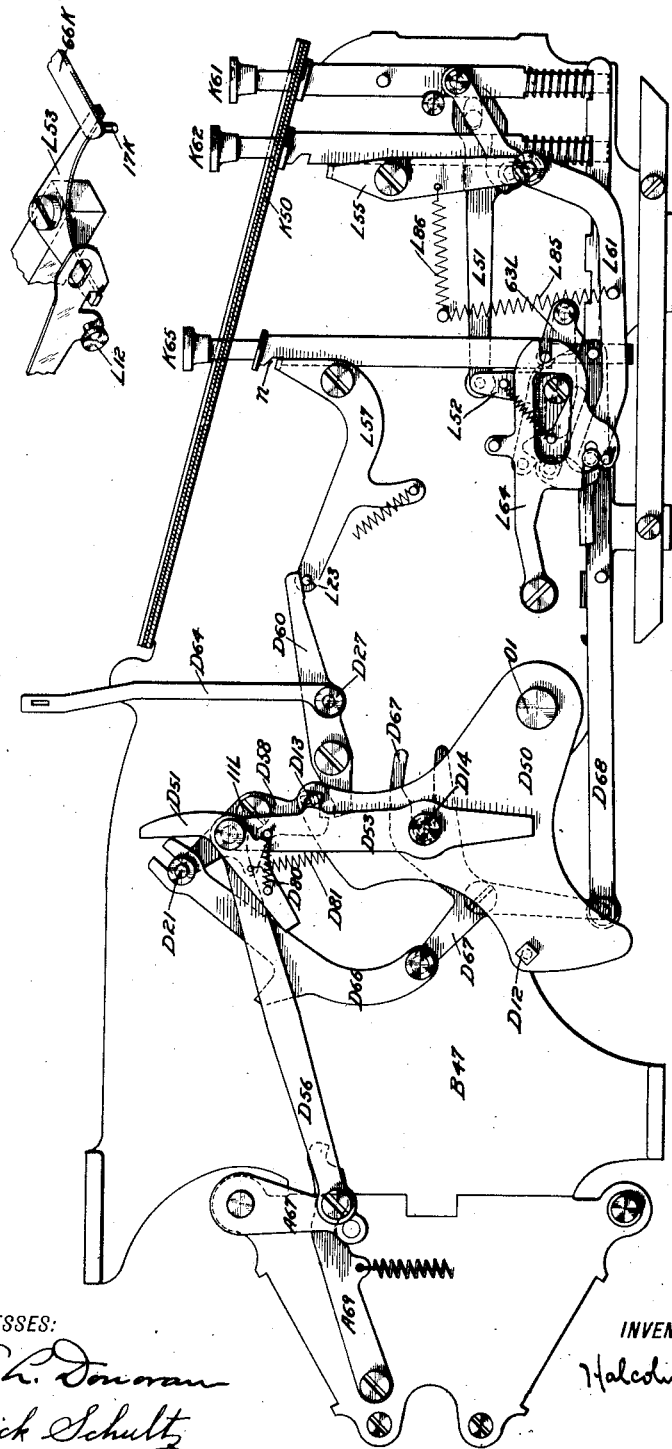

H. ELLIS.
COMBINED ADDING MACHINE AND TYPE WRITER.
APPLICATION FILED DEC. 30, 1908.
1,197,276.
Patented Sept. 5, 1916.
28 SHEETS—SHEET 21.
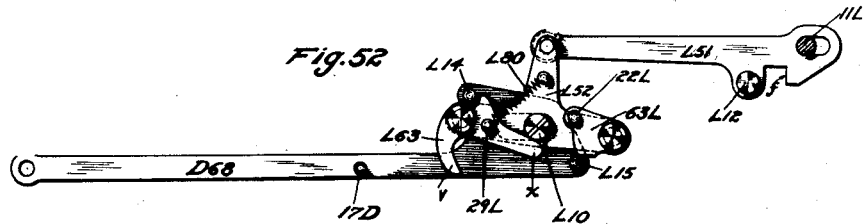
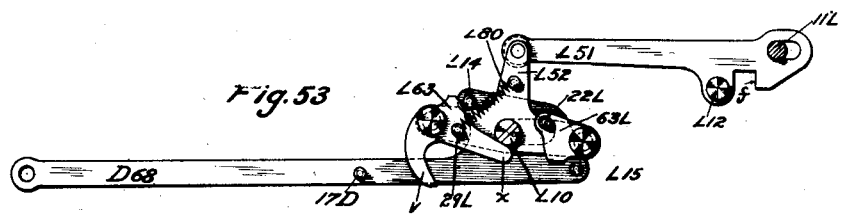
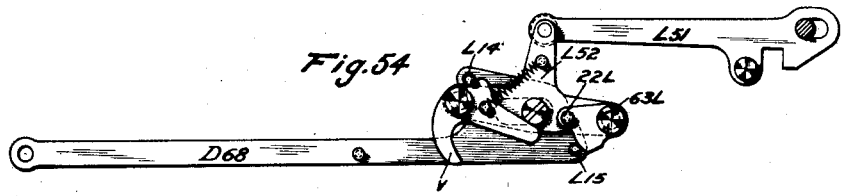
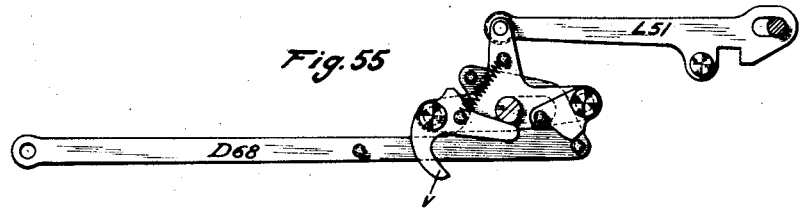
WITNESSES:
INVENTOR
Halcolm Ellis

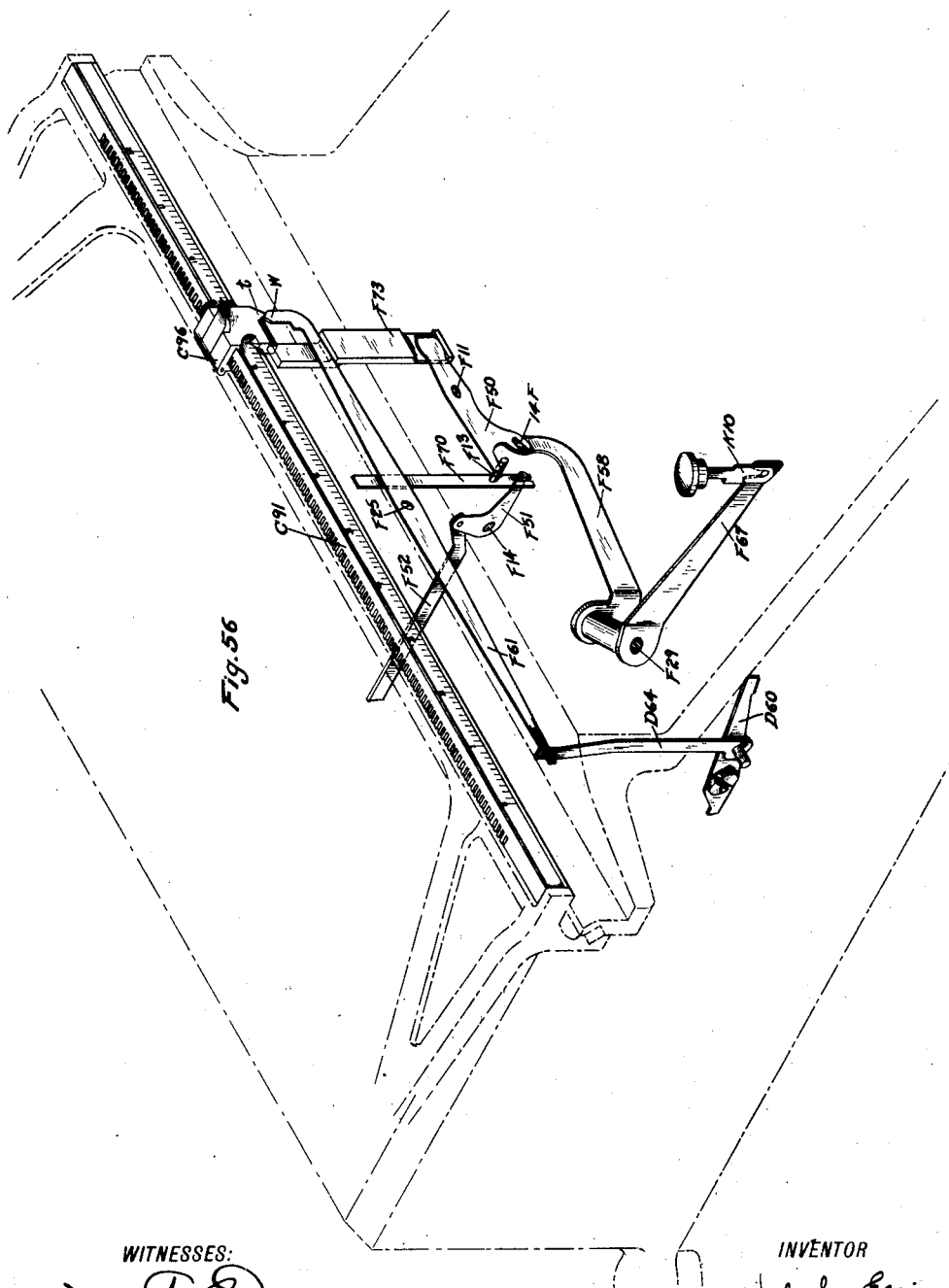

H. ELLIS.
COMBINED ADDING MACHINE AND TYPE WRITER.
APPLICATION FILED DEC. 30, 1908.
1,197,276.
Patented Sept. 5, 1916.
28 SHEETS—SHEET 23.
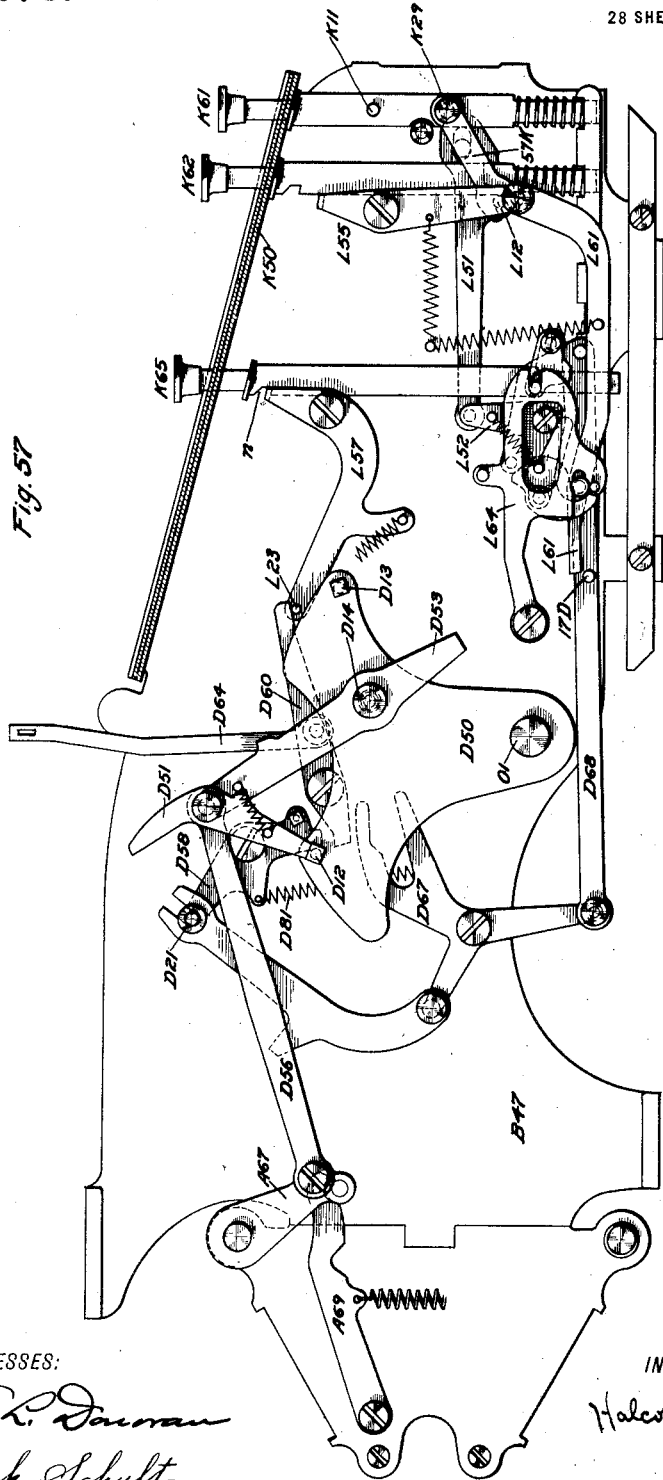
WITNESSES:
INVENTOR

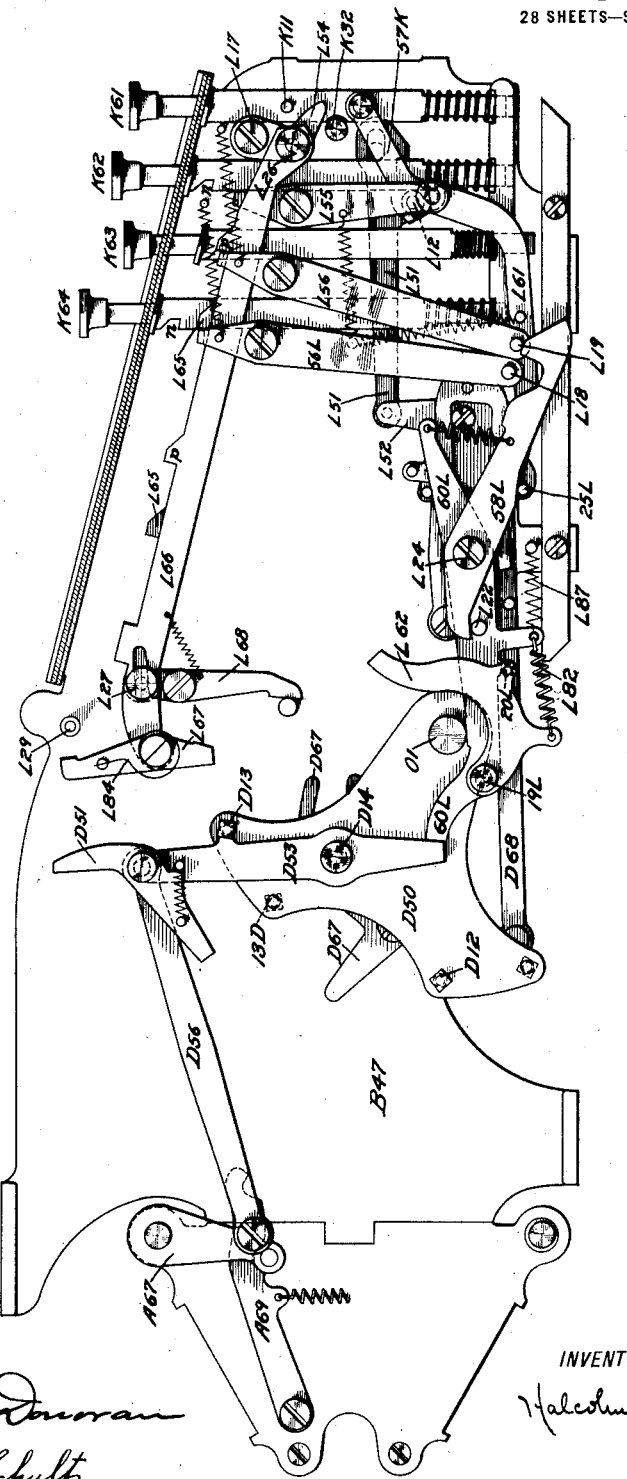

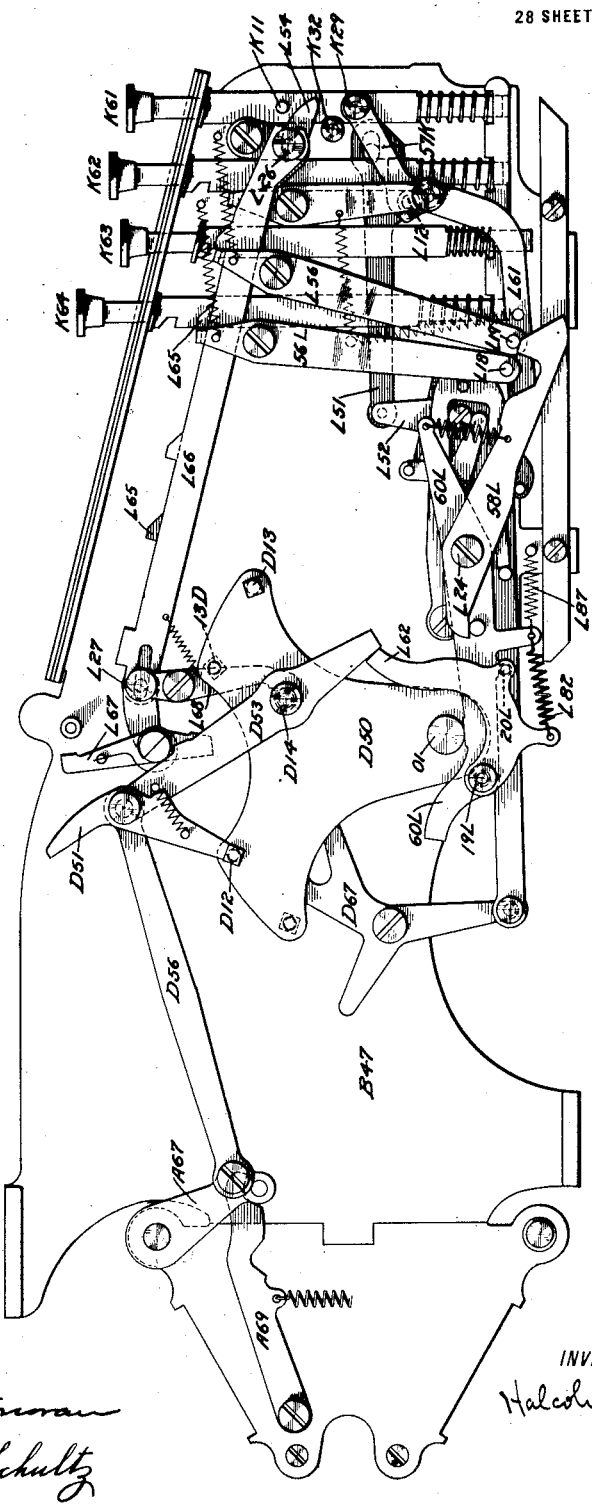

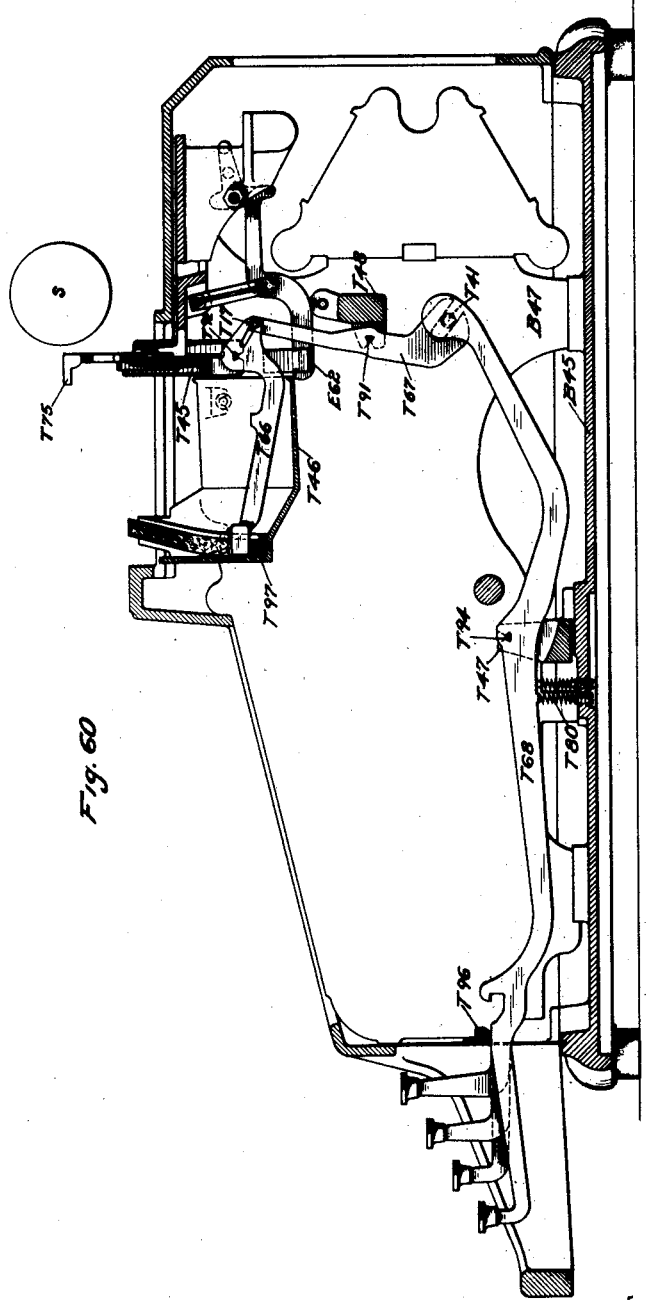

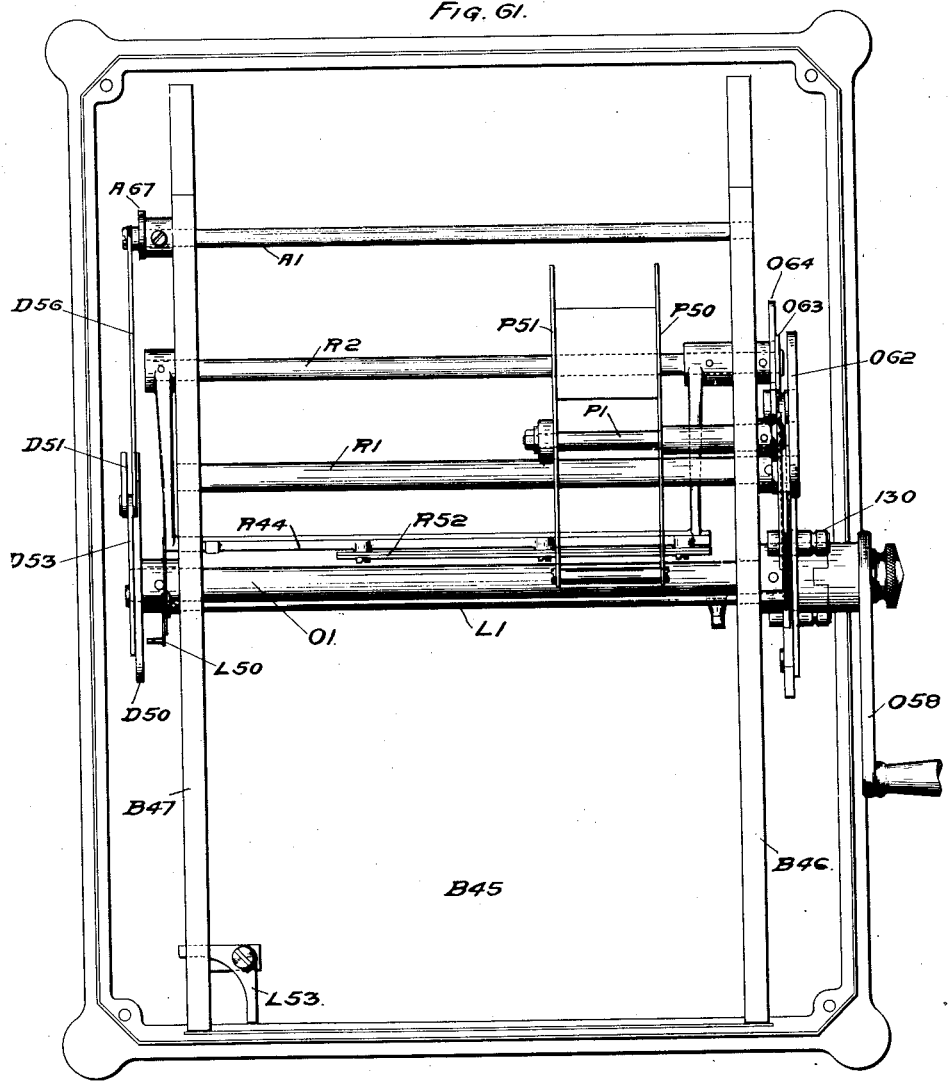

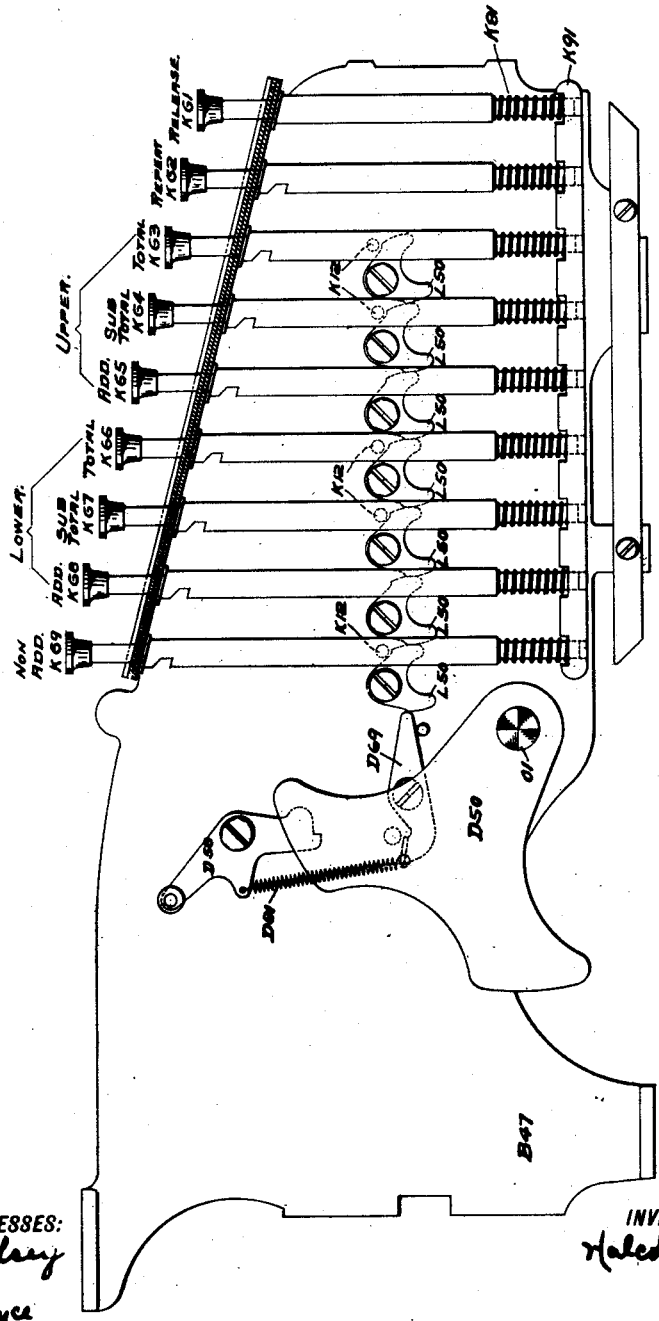

UNITED STATES PATENT OFFICE.

HALCOLM ELLIS, OF EAST ORANGE, NEW JERSEY.

COMBINED ADDING-MACHINE AND TYPE-WRITER.

1,197,276.  Specification of Letters Patent.  Patented Sept. 5, 1916.

Application filed December 30, 1908. Serial No. 470,108.

*To all whom it may concern:*

Be it known that I, HALCOLM ELLIS, a citizen of the United States, residing in the city of East Orange, State of New Jersey, have invented certain new and useful Improvements in Combined Adding-Machines and Type-Writers, of which the following is a sufficiently exact description to enable one versed in the art to fully understand the working thereof, reference being had to the accompanying drawings, which form part of this specification.

The object of this invention is to provide a new and improved form of machine for writing, and for performing various arithmetical calculations and automatically printing the result of these calculations in a manner which will be more explicitly detailed in the description that follows.

Another object of this invention is to provide an adding and listing machine with a printing device capable of powerful manifolding ability and with permanent alinement both in the listing of numbers and in the printing of totals.

Another object of this invention is to provide a machine which can be changed from the printing of United States money to plain units at the will of the operator.

Another object of this invention is to provide a machine which will add numbers, printing in a plurality of columns, and giving the separate total automatically of each column, irrespective of the order in which the numbers so added are printed, together with numerous other features which will be fully explained in the detailed description.

In referring to the drawings, similar letters and figures in the different views will refer to similar parts in the machine.

Figure 2:
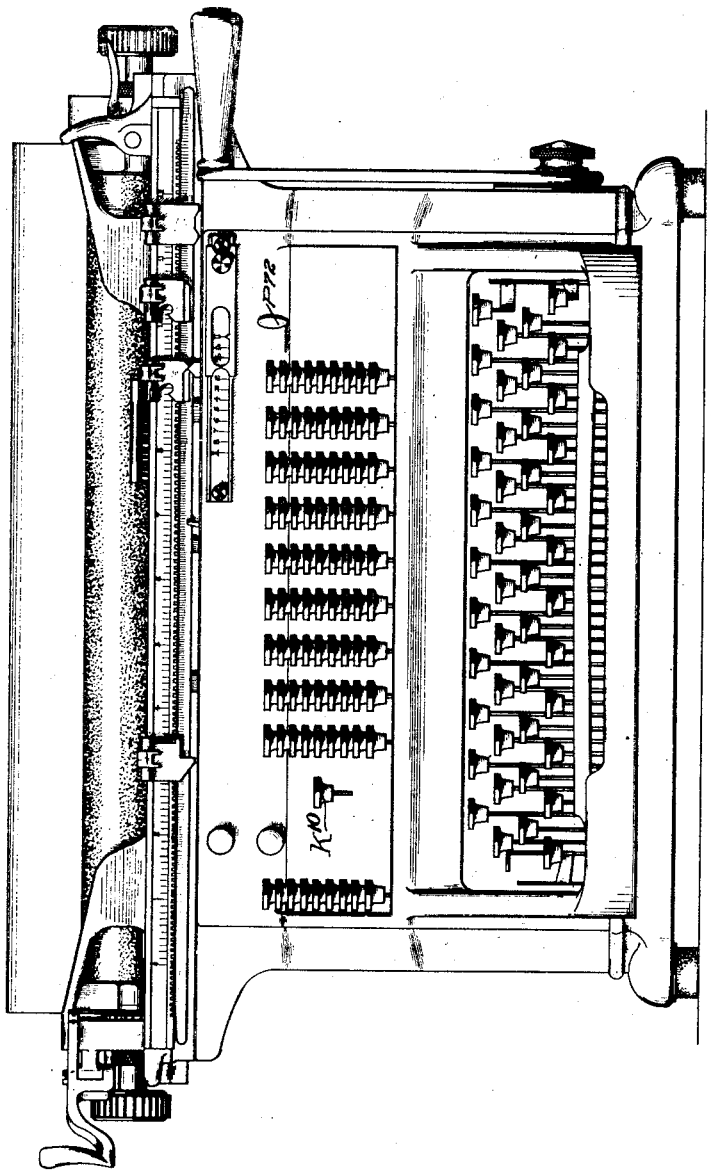
Figure 3:
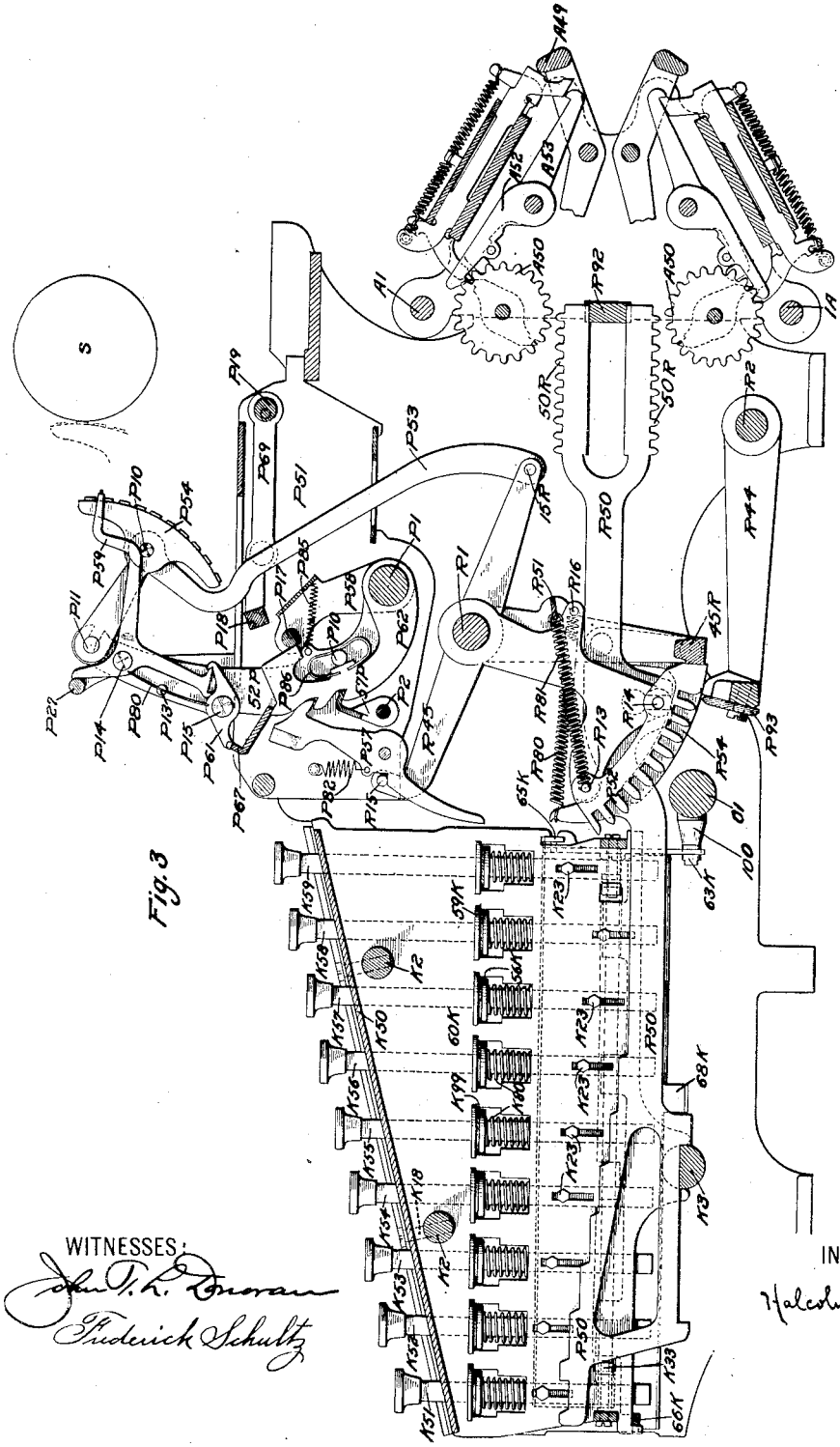
Figure 4:
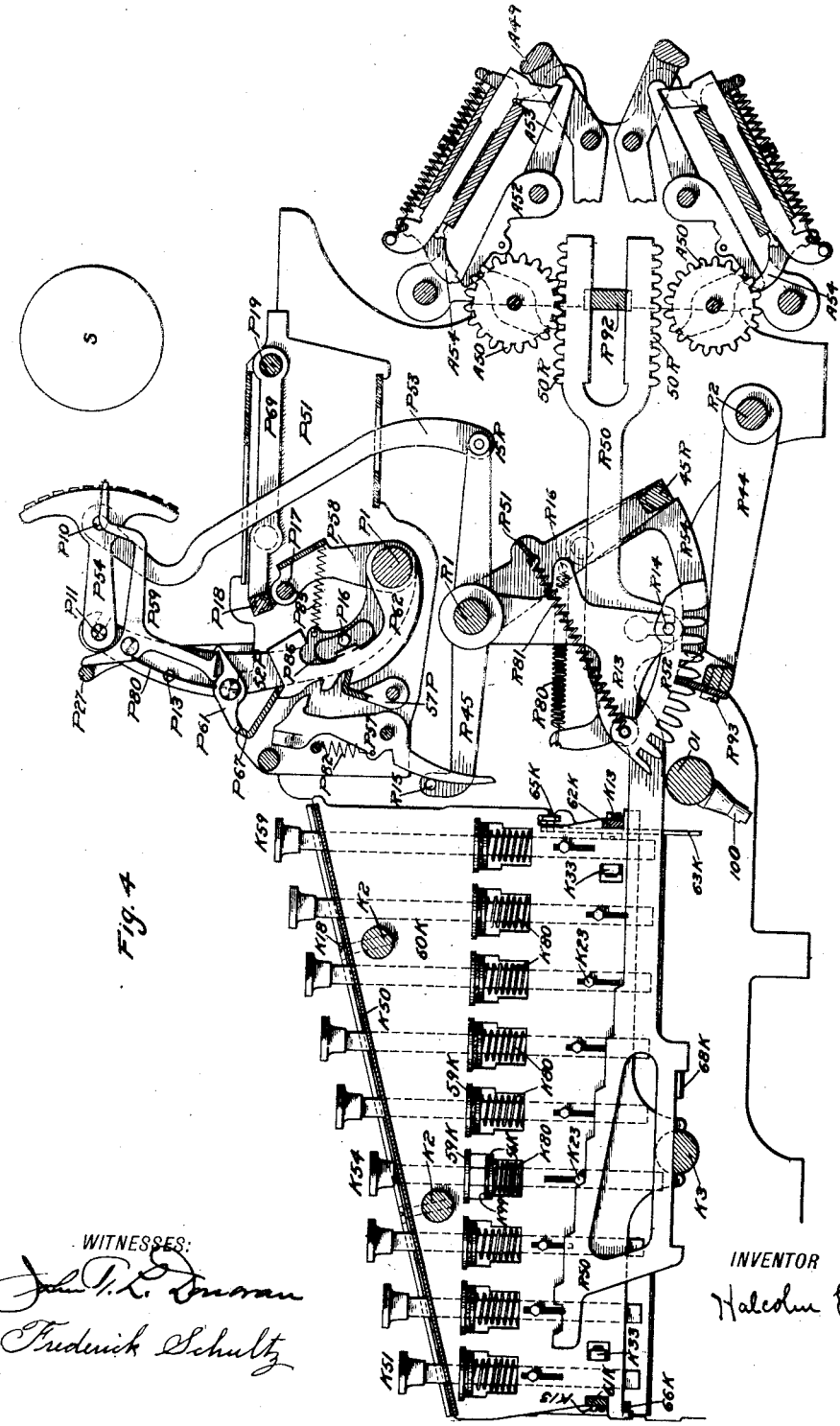
Figure 5:
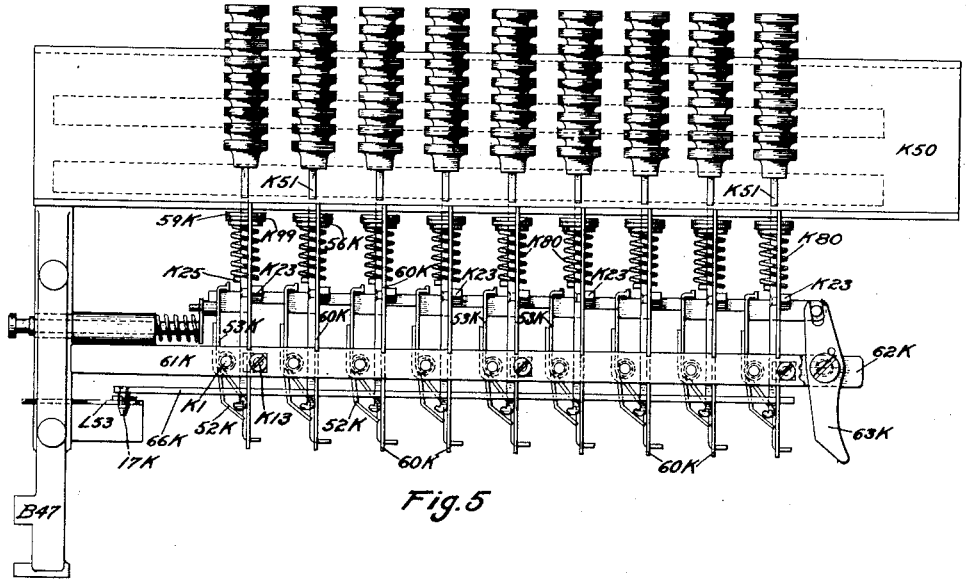
Figure 6:
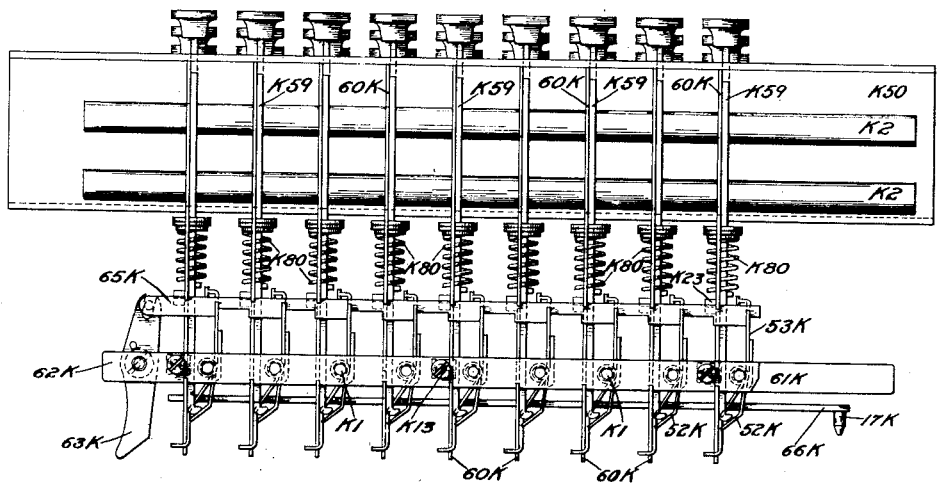
Figure 25:
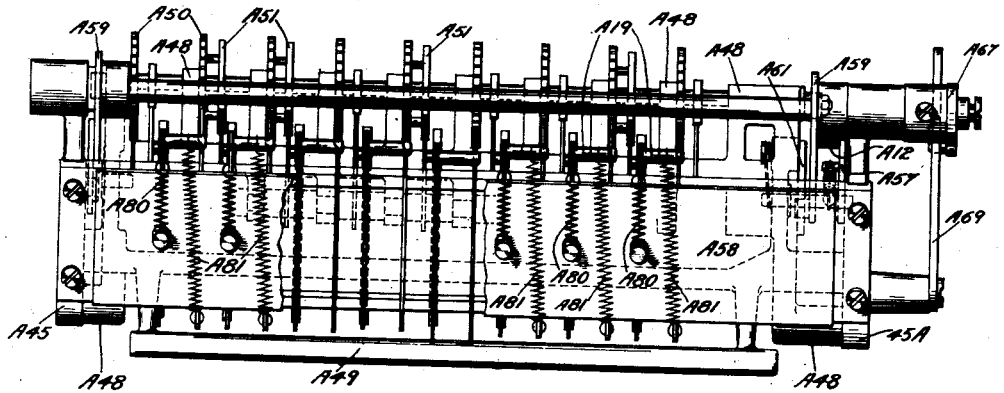
Figure 26:
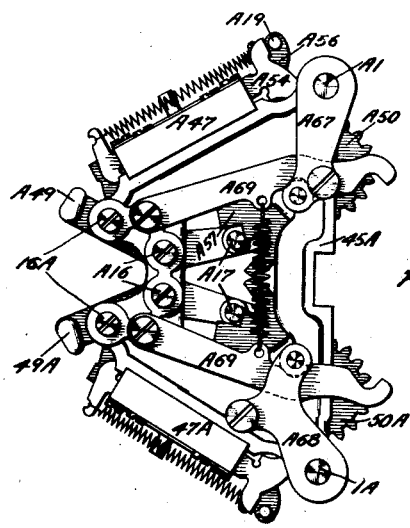
Figure 24:
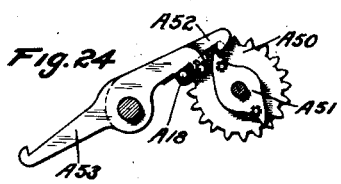
Figure 34:
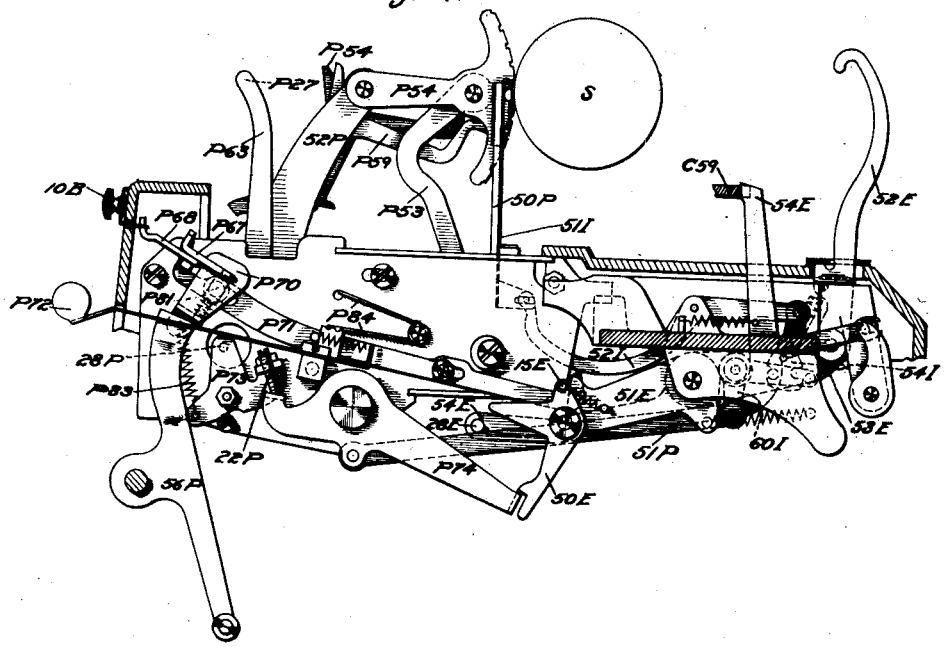
Figure 35:
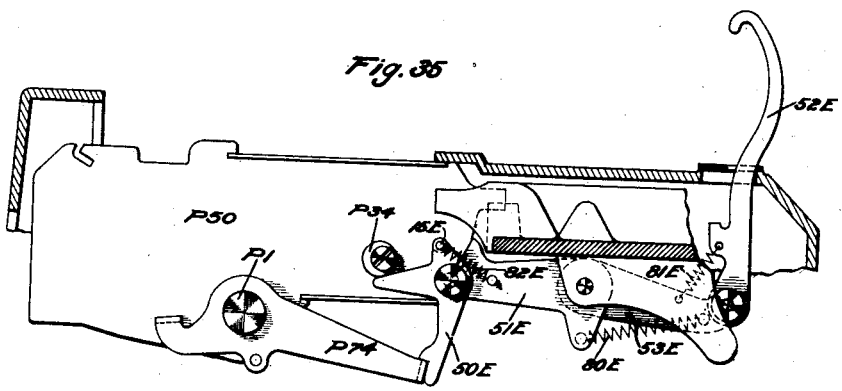
Figure 41:
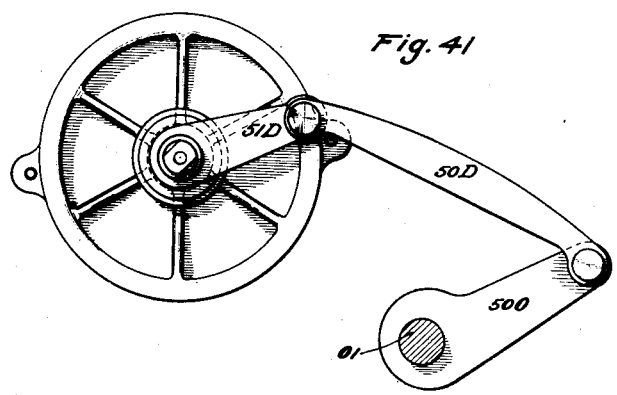
Figure 42:
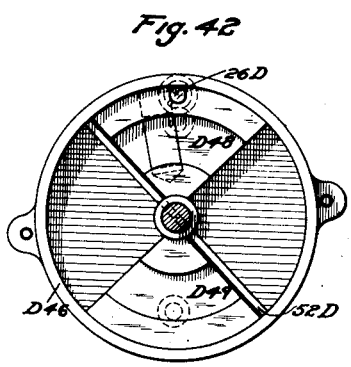
Figure 43:
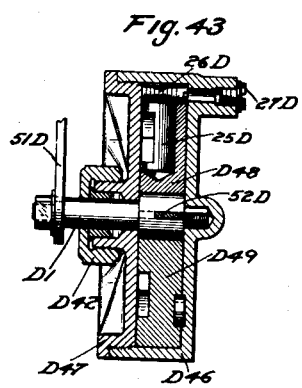
Figure 44:
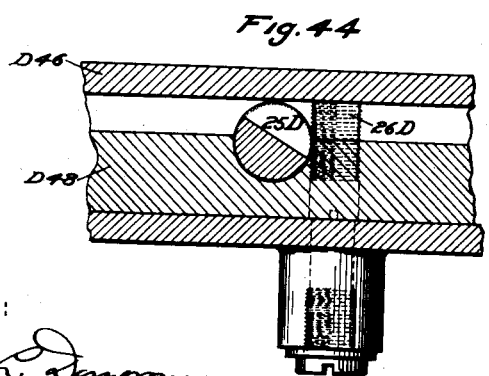
Figure 45:
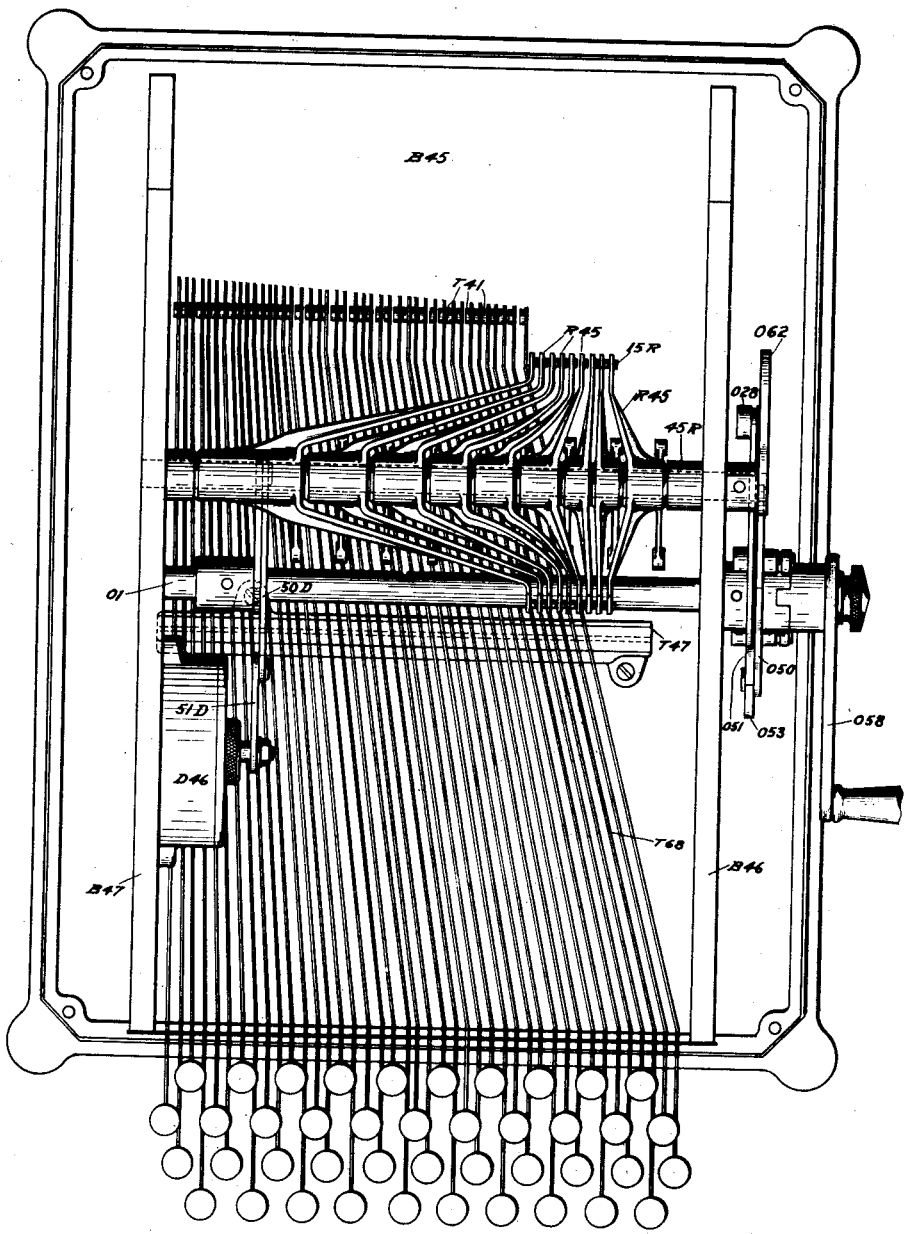
Figure 46:
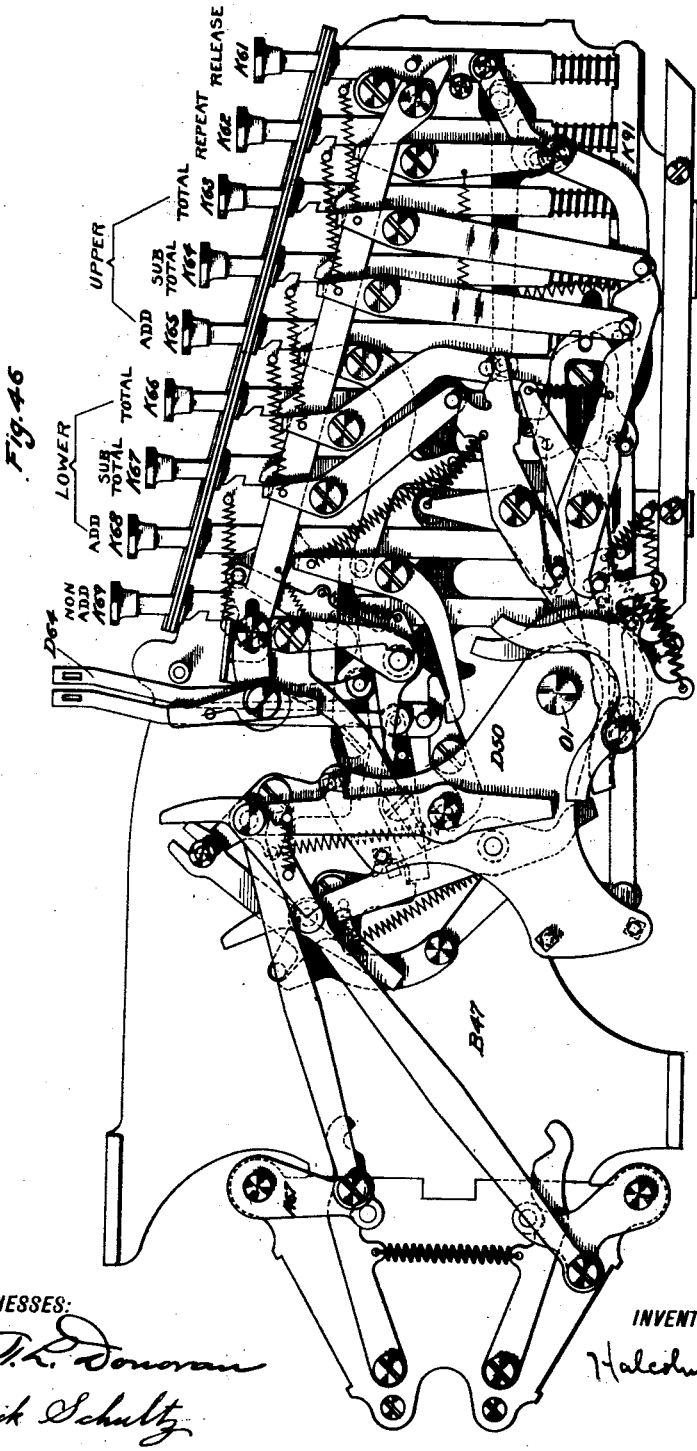
Figure 47:
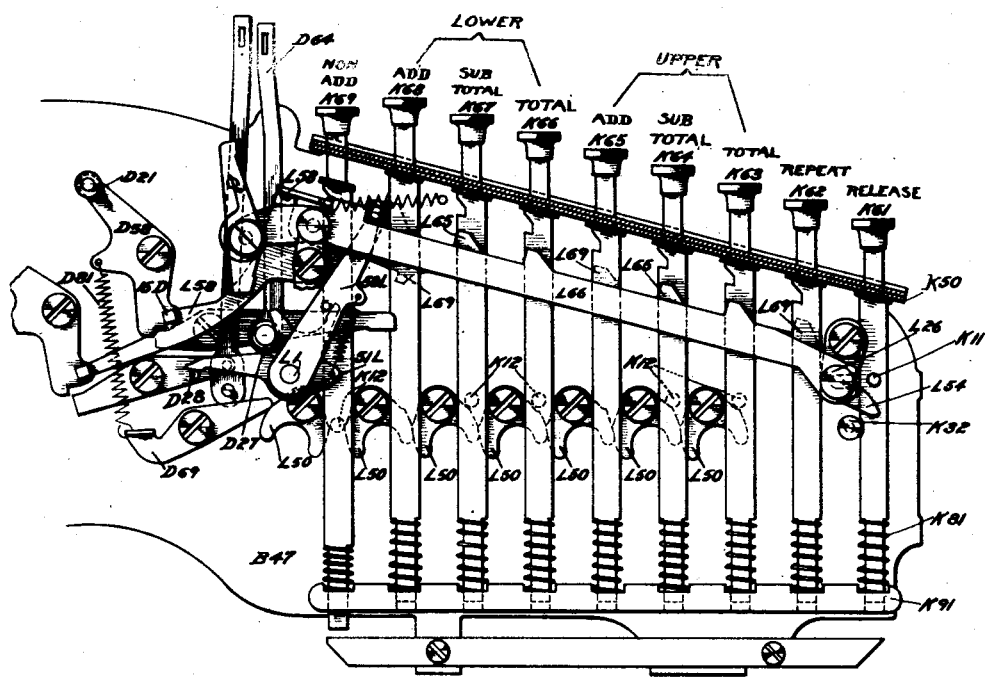
Figure 48:
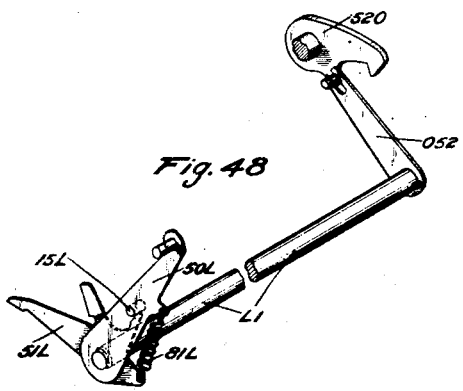

Figure 1 is an elevation of the right side of the machine, showing it complete with the case on. Fig. 2 is a front elevation of the complete machine with the case on. Fig. 3 is a vertical, longitudinal section through the mechanism for the adding and printing of numbers, many parts being omitted or indicated only slightly in order to more clearly illustrate main features. In this view, the machine is in its normal position. Fig. 4, a similar diagram or section to Fig. 3, showing the parts with one numeral key depressed, and the adding and printing mechanism in position just prior to printing. Fig. 5, a front elevation of the keyboard section with parts broken away to more clearly illustrate the construction. Fig. 6, a rear elevation of the keyboard section. Figs. 7, 8, 9, 10 and 11 are a series of diagrams for illustrating the action of the numeral key, its latch and lock, and their coöperation with the rack lock. Fig. 12, a right side elevation of the numeral key latch and lock, and the rack lock. Fig. 13, a detailed cross section of the numeral key lock. Fig. 14, an end elevation of Fig. 12. Fig. 15, a detail showing the method of connecting the cross bars to the order plates in assembling the keyboard section. Figs. 16, 17, 18, and 19 are a series of diagrams in the form of vertical cross sections, illustrating the accumulating mechanism in its various positions. Figs. 20, 21, and 22 are a series of diagrams, showing the cam for operating the accumulator wheels, and the restoring bar for the carrying device in their various positions. Fig. 23, a cross section of the restoring bar for the carrying mechanism showing its three positions—two of these being indicated by dotted lines. Fig. 24, a detail showing the relation of the accumulator wheels and cams and the carrying hooks. Fig. 25, a plan of the accumulator section, with parts broken away. Fig. 26, a left-hand elevation of the accumulator section. Fig. 27, a vertical, longitudinal section of the numeral printing device, showing the parts in position of printing. Fig. 28, a similar section to Fig. 27, showing the parts in their restored position. Fig. 29, a similar section to Fig. 27, showing the type after rebound from the paper, and the punctuation printer in printing position. Fig. 30, a right-hand elevation of the numeral printing device, also showing mechanism for automatic paper feed. Fig. 31, a detail showing the front elevation of the punctuation slide. Fig. 32, an isometric projection of the punctuation cam slide. Fig. 33, a detail front elevation, showing the method of operating the "0" printing triggers from the left. Fig. 34, a right-hand elevation of the numeral printing mechanism and automatic paper feed device, parts shown in printing position. Fig. 35, a detail showing the operation of the automatic paper feed mechanism. Fig. 36, right elevation of the automatic paper feed, showing how the paper feed is disconnected by the punctuation slide. Fig. 37, a detail showing the engagement of the punctuation slide and the paper feed release being a plan view of pieces P67, P68, and P71 shown in Fig. 36. Fig. 38, a plan showing the paper feed release lever and connections. Fig. 39, an elevation of the right-hand side, showing the handle and its immediate connections—all other parts being omitted, the parts being shown in their normal position. Fig. 40, elevation similar to Fig. 39 with the parts shown at the end of the forward stroke of the handle. Fig. 41, a right elevation of the governor and its connection to the main shaft of the machine. Fig. 42, the governor with the top removed. Fig. 43, vertical cross section of the governor. Fig. 44, enlarged detail view, showing construction of the governor valve. Fig. 45, plan of base, showing typewriter key levers, governor, and connecting levers between the racks and numeral printing device. Fig. 46, an elevation of the left-hand side of the machine, showing the nine operating keys together with their connections for producing the various functions of the machine connected with the adding and printing of numbers. Fig. 47, a detail elevation of the operating keys, showing the interlocking device and connections for operating the handle lock and non-add key. Fig. 48, an isometric view, showing the construction of the handle lock. Fig. 49, left elevation, showing the release key, repeat key, and one adding key, and their connections—all other parts being omitted for the sake of clearness. Handle in its forward position. Fig. 50, left elevation, showing release key, repeat key, and one adding key, in its depressed position, the connections of these keys—all other parts being omitted for the sake of clearness. Handle in its normal position. Fig. 51, an isometric view, showing the connection to the numeral key releasing mechanism. Figs. 52, 53, 54, and 55 a series of detail views, showing the operation of the mechanism for releasing the numeral keys, both in the process of addition and in the taking of totals. Fig. 56, an isometric view of the carriage tabulating mechanism for bringing into engagement one of the sets of accumulators. Fig. 57, left elevation showing release key, repeat key, and one adding key in its depressed position, the connections of these keys, all other parts being omitted for the sake of clearness. Handle in its forward position. Fig. 58, left elevation showing release key, repeat key, one total key, and one subtotal key, the total key being depressed and the handle in its normal position. Fig. 59, left elevation showing the same parts as in Fig. 58 with the handle in its extreme forward position. Fig. 60, vertical, longitudinal section, showing the typewriter action. Fig. 61, a plan of the base of the machine, showing the side frames and the main cross shafts extending between the same. Fig. 62, a vertical elevation of the lefthand side, showing the locking device between the operating keys and the handle shaft in the position assumed when the handle has started on its forward movement and none of the operating keys are depressed.

By examining Fig. 1, which is the side view of the complete machine, and Fig. 2, which is a front view of the same, it will be seen that the general appearance of this device resembles in many respects an ordinary typewriting machine and in many other respects resembles an ordinary adding and listing machine. The space-bar and four front rows of keys operate the typewriting mechanism, and are provided with the usual shift keys, tabulating key, line lock release, etc., and the keyboard is arranged in the customary form, known as the "Universal keyboard." The back nine rows of keys are used for the purpose of setting the number printing and adding mechanism in a manner similar to that employed on other adding and listing machines. The handle on the right-hand side of the machine is used for causing the operation of the number printing device and the adding mechanism. The carriage is on top of the case of the machine and has a lateral travel, in all respects similar to other typewriting machines. The ribbon winding mechanism and ribbon spools are in many respects similar to those employed on regular typewriting machines, and the peculiar and special features pertaining both to the ribbon mechanism and carriage will be more fully described in separate applications covering these respective subjects.

In describing this device, in detail, it must be kept in mind that there are two distinct sets of mechanism contained therein, one pertaining to the number-printing and adding mechanisms. I will begin by describing the adding and number-printing device and its various auxiliary connections, and afterward describe the typewriting device.

*Operation of racks and stops for same.—* Referring to Fig. 3 and Fig. 4, we have two vertical, longitudinal sections through the number-printing and adding sections of the machine. These two views include only the most necessary parts for explaining the principles of action of this device, many features, parts, and elements being omitted for the sake of clearness in the drawing, so that these figures might more properly be called diagrams than true sections of the machine. However, they serve to illustrate the functions and operations of this part of the device. R50, is the rack, a long piece extending from the front end of the keyboard back to the adding wheels, A50. The rack R50, slides back and forth in the machine on the rod K3, extending across the machine under the keyboard and past the cross bar R92, at the rear end of R50; both the rod K3, and the bar R92, being provided with suitable grooves in which the rack R50, can slide, the grooves serving as guides to maintain the rack R50, in its vertical position. On the top and bottom of the rack R50, are gear teeth 50R, which properly mesh with the gear teeth in the small gear wheels A50, when the same are brought into engagement with the rack R50. On the upper side of the rack R50, beginning near the front end, are a series of steps which serve as the abutting surfaces to engage stops K23, mounted on the numeral keystems K51; K52, to K59. These keystems K51, to K59, are normally held in the positions shown in Fig. 3 by means of the springs K80, which press against the order plates 60K, at their lower ends, and against the washer 56K, secured to the keystems K51, to K59, on their upper ends. Above the washer 56K, there is a felt washer K99, and above this washer K99, there is a third washer 59K, which is secured in the order plate 60K, so that after a keystem has been depressed, and is released, the action of the spring K80, restores the keystem to its normal position but the felt washer K99, renders this operation comparatively noiseless. The location of the various steps on the upper side of the rack R50, is so arranged that each step engages a particular one of the stops K23, on one of the nine keystems K51, to K59, and being arranged vernier fashion, the engagement of the rack R50, with any stop K23, will permit of a definite amount of sliding movement of the rack R50, for instance, the engagement of the rack R50, with the stops K23, on the keystem K51, would permit the rack R50, to move to the rear a distance of one of the teeth 50R. If, for instance, the keystem K54, was depressed, as shown in Fig. 4, and the rack moved to the rear until it engages the stop K23, on keystem K54, there would be a movement of four teeth 50R, past the bar R92. If at this time the adding wheel A50, is brought into engagement with the rack R50, as shown in the upper wheel of Fig. 4, and the rack R50, is then restored to the position shown in Fig. 3, the upper adding wheel A50, will be rotated a distance of four teeth. If, by a subsequent similar operation, any amount greater than five was added, suitable carrying devices are connected to the adding wheels A50, to cause the wheel in the next column to the left to rotate a distance of one tooth.

*Connections between racks and type sectors.*—Mounted on the shaft R1, located above the rack R50, is a three-armed lever R45,—one arm extending forward and provided with a small, round pin R15, near its extreme end. The arm extending to the rear is provided with a similar pin 15R, and the third arm extending downward is provided with two terminals to which is secured a segmental rack R52, by pins R13, and R14. The pin R14, extends to the left side and engages a vertical slot in the lower side of the rack R50, as clearly shown by the dotted lines both in Fig. 3 and Fig. 4, so that any movement, backward or forward, of the rack R50, would cause a rotation about the shaft R1, of the three-armed crank R45, corresponding in extent to the extent of the travel of the rack R50. From the rear arm of R45, a connecting link P53, extends from the pin 15R, to a pin P10, in the type sector P54. This type sector is pivoted at P11, so that it can be rotated in a vertical direction, there being ten positions in which the rack R50, can be located, there are correspondingly ten type on the type sector P54. Inasmuch as the pivot P11, is connected to an arm 52P, which can swing about the shaft P1, it is evident that after the type sector P54, is swung upward until the proper type comes into position, that a movement of the arm 52P, about P1, in the direction of the platen S, would cause the type of the type sector to strike the platen S, and print thereon. This position is indicated in dotted lines in Fig. 3. The details of the mechanism pertaining to the printing device will be more particularly described when we take up that section.

*The alining device.*—The alinement of the type is dependent upon the location of the rack R50, and a more accurate stop than K23, on the keystems K51, to K59, is desirable; therefore, a bar R93, called the alining bar, is mounted upon arms R44 secured to a shaft R2, and just prior to the time when the printing is to take place, the alining bar is raised and enters between the teeth of the sector R52. This brings the three-armed crank R45, to a definite location within the limits of the lost motion between the connecting link P53, and the pins 15R, and P10, and as there are nine of these type sectors and nine levers R45, the alining bar R93, will bring all of the type to a constant alinement. After an operation of adding has been performed, or a series of these operations, and it is desired to take a total, the wheels A50, are first brought into engagement with the rack R50, and the racks are moved backward until the wheels come to their starting point in a manner usual in this class of machines—which operation causes the type to be set according to the accumulation on the adding wheels A50.

In describing the operation and details of this machine, it will be desirable to consider the device section by section, and I will begin with the keyboard.

*The adding keyboard.*—Keeping in view Figs. 3 and 4, and referring also to Figs. 5 and 6, it will be seen that the keyboard section of the machine is built as a unit and is mounted under and secured to the keyboard plate K50, which is a rectangular plate, perforated with small rectangular slots for the keystems to pass through. These keystems are numbered K51, to K59, consecutively, and are arranged in columns in the usual manner—a plurality of these columns being arranged side by side, one for each denomination or order in the machine. Underneath the keyboard K50, there is arranged a series of vertical plates 60K, which are called order plates. These are secured to the plates K50, by means of two rods K2, that pass through all of the order plates 60K, and the rods are held to the plate K50, by means of screws K18. The keystems K51, to K59, pass down on the left-hand side of the order plates 60K, and are held in contact therewith by means of hexagon-headed rivets K23, which pass through vertical slots in the plate 60K, as clearly shown in Figs. 3 and 4. These rivets K23, form the stops for the rack R50, and serve as a means of guiding the keystems K51, to K59, in a vertical direction. Above the rivet K23, opposite each of the keystems K51, to K59, there is an irregular shaped hole in the order plate 60K. Through the upper end of this hole, there is inserted a flat washer 59K, which has a rectangular slot through it, through which the keystem passes. This washer 59K, is held fixedly in the order plate 60K, and just below it there is a loose washer K99, of felt, mounted on the keystem, and below this felt washer K99, is a third washer 56K, which is secured to the keystem and moves with it. Between the washer 56K, and the bottom of the hole aforesaid, is a compression-coil spring K80, the lower end of which rests against the edge of the hole in the order plate 60K, and the upper end presses against the washer 56K, mounted on the keystem—all of which is clearly shown in Figs. 3 and 4. When a keystem is depressed, as in the case of K54, in Fig. 4, it carries down with it the washer K99, and compresses the spring K80, and when the keystem is released, the spring K80, returns it to its normal position. The order plates 60K are further maintained in their latter position by two bars extending horizontally across their front and rear edges, which bars are marked 61K, and 62K. These bars are notched in a suitable fashion to engage each of the order plates 60K, and are held in position by means of a small clamp nut K33, and a screw K13, passing through the bars 61K, and 62K, as clearly shown in the detail of Fig. 15. The lower side of the order plate 60K, rests in small slots in the cross bar K3, extending between the side frames of the machine. By examining Figs. 3 and 4, it will be readily seen how the various hexagon-headed rivets K23, form stops to limit the travel of the rack R50, as said rack moves to the rear. The hexagon rivet on keystem K51, would permit the rack R50, to move a distance of one of the teeth 50R. The stop K23, on keystem K52, would permit the rack R50, to move twice this distance, etc., up to the ninth keystem K59, which would permit the rack R50, to travel its full distance on nine teeth. The rack R50, is not, however, provided with a special shoulder or step to engage the stop K23, on keystem K59, but travels its full distance as limited by the length of the slide engaging the cross bar K3. The cross bars 61K, and 62K, serve also as a means of supporting the pivots K1, of the latches 52K, which hold the keystems K51, to K59, in their depressed position during the operation of the machine. These latches are arranged so that there is one to each column of nine keystems, and they swing sidewise from the keystems. Swinging about the same pivot K1, are the keystem locks 53K. These features are clearly shown in Figs. 5 and 6, and in detail in Fig. 12. There is also mounted on the pivot shaft K1, the rack lock 68K, and suitable springs K82, control the keystem latch 52K, and lock 53K, and a spring K83, controls the rack lock 68K. The locks 53K, are each provided in their rear ends with a hook 54K, and a cross bar 65K, (see Fig. 6) is supported by and engages each of these locks 53K. This bar 65K, is pivotally connected to a cam lever 63K, which lever is pivoted in the cross bar 62K, and extends downward into the path of the pin 100, mounted in the shaft O1. When the machine is in its normal position, the pin 100, which is in the position shown in Fig. 3, engages the cam lever 63K, and holds the bar 65K, in the position shown in Fig. 6. When the operating handle is moved and the shaft O1 turns, the pin 100 moves to the position shown in Fig. 4, thereby disengaging from the piece 63K which leaves the bar 65K free to be moved by the pieces 53K.

The operation of the keystem, its latch 52K, its lock 53K, and the rack lock 68K, can now best be understood from an examination of the series of diagrams Figs. 7 to 11 inclusive. Fig. 7 shows the keystem K51, in its normal position. Fig. 8 shows the keystems K51, depressed and latched down by means of the latch 52K. Fig. 9 shows the same combination after the handle of the machine has been operated—the handle causing the bar 65K, to move so as to permit the keystem lock 53K, to advance toward the keystem K51. This movement of the keystem lock 53K, permits the rack lock 68K, to assume the position shown in Fig. 9. This is done through the effort of the spring K83, which spring tends to keep the upper end of the rack lock 68K, in contact with the keystem lock 53K. The spring K83, is not, however, as strong as the spring K82, which operates the latch 52K, and the lock 53K. Therefore, in those columns in which keystems are not depressed, the relative position of the parts after the handle is started is shown in Fig. 10, the rack lock 68K, being still in engagement with the rack R50, and held there by the latch 52K. When the keystem is depressed and latched, as at Fig. 8, the latch 52K, is held by the keystem K51, far enough back from the position shown in Fig. 7 to permit the rack lock 68K, to disengage the rack R50, as soon as the key lock 53K, moves toward the keystem K57. In Fig. 9, it will be seen that the movement of the lock 53K, permits the rack lock 68K, to swing free from the rack R50. Thus it is that the racks R50, are unlocked only in those columns in which keys are depressed. If a keystem is depressed part way and held there while the handle is operated, the rack R50, is not released. This is clearly shown in Fig. 11. The small projection K25, on the side of the keystem K51, coming in front of the upper end of the key lock 53K, prevents said key lock 53K, from swinging toward the keystem and therefore prevents the rack lock 68K, from releasing the rack R50. The upper edge of the keystem lock 53K, is flattened out, as shown in detail section Fig. 13, in order to present a longer surface for engaging the small lug K25, on the keystems K51, to K59. After the handle of the machine has been operated on its forward stroke and an addition has been performed on the machine, it becomes desirable to release such of the keystems K51, to K59, as have been depressed, and this is done by means of the bar 66K, which engages the keystem latches 52K, in a manner similar to the way in which the bar 65K, engages the keystem locks 53K, this bar 66K, being moved to draw the latches 52K, away from the keystems and permit the springs K80, to return the keystems K51, to K59, to their normal positions. The operation of this bar 66K, will be described in detail in connection with the mechanism of the left-hand side.

*The adding section.*—Having described the construction of the keyboard, I will next consider the adding section, and, in this connection, it will be well to refer to Figs. 16 to 26 inclusive, as well as Figs. 3 and 4. On examination of Figs. 3 and 4 and Figs. 25 and 26, it will be disclosed that the adding section is made as a unit mounted on suitable frames A45, and 45A, which frames are secured to the main side frames of the machine. The adding section comprises two sets of adding wheels A50, which engage the teeth 50R, of the rack R50,—one set engaging the upper teeth and the other set engaging the lower teeth, as is clearly shown in Figs. 3 and 4. Inasmuch as these two sets of adding wheels and their connecting mechanism are in all respects alike, but one of them will be described. The adding wheels A50, are mounted in a swinging frame A48, which frame is pivoted into the side frames A45, and 45A, on the pivot screws 16A, and has a limited swinging movement up and down about this pivot 16A. The shaft A2, of the adding wheels A50, projects beyond the sides of the frame A48, and terminates in a suitable roller which operates in the cam slot of the cam A59, mounted on the shaft A1. There are two of these cams A59,—one for engaging each end of the shaft A2, as clearly shown in Fig. 25. From an examination of Figs. 20, 21, and 22, it will be seen how the partial rotation of the shaft A1, will cause the roller at the end of the shaft A2, to raise and lower the frame A48, and so bring the adding wheel A50, into and out of engagement with the teeth of the rack R50. The shaft A1, is turned by means of a suitable crank A67, at the left-hand end of the shaft A1, and is held at each end of its stroke by the detent A69. The connection to this crank A67, and the means for operating the same, and for timing such operations will be more fully explained in the description of the left-hand side of the machine. For the present, it is sufficient to state that the turning of the crank A67, operates the cams A59, which in turn operate to engage and disengage the adding wheels A50, from the racks R50.

*Carrying mechanism.*—Whenever the adding wheels A50, are withdrawn from engagement with the teeth of the rack R50, they come into engagement with a single tooth A54, which tooth A54, is so arranged that if the adding wheel A50, in the order next to the right has turned ten teeth, the tooth A54, will, after the adding wheel A50, has come into engagement with it, move a distance of one tooth of the adding wheel A50, in the direction the wheel rotates when adding. The mechanism for accomplishing this result is clearly shown in the Figs. 16 to 22. Each adding wheel A50, has twenty teeth, and secured to the left-hand side of the same is a two point cam A51, (see Fig. 24). This cam A51, turns with the adding wheel A50, in the usual manner. Mounted in the wheel frame A48, there is a second shaft A3, on which are mounted hooks A52, and A53. The hook A52, extends toward the wheel A50, and has its lip extending into the path of the end of the cam A51, as shown in Fig. 24. This hook A52, has a small pin A18, extending under a tail from the hook A53, and engaging the same so that when the hook A52, is raised, it will operate to depress the hook A53.

Extending across the machine and secured to the two side frames A45, and 45A, is a rectangular box A47, which box has slots cut in its front and back edges, and the tooth pieces A54, fit into these slots in the box A47, and fit loosely enough so that they can slide back and forth. The shape of the piece A54, is such that it can only slide the distance of one pitch of the rack R50, or wheel A50. This is clearly shown in Fig. 3. Along-side of the piece A54, is a somewhat similar piece A56, mounted in a similar slot in the box A47, and provided at its lower end with a tail which comes into the path of and engages the lip of the hook A53, operated by the cam A51, of the wheel next to the right. In the upper end of the piece A56, there is a pin A19, projecting laterally across the upper end of the tooth piece A54. A suitable cover, A58, is secured to the top of the box A47, and keeps the pieces A54, and A56, in their slots. The piece A54, at its lower end is provided with an upturned tail, and a light spring A81, extends from this tail to the pin A19, and tends to hold these two pieces in contact. A spring A80, is connected to the upper end of the piece A56, and extends to a suitable fastening in the cover A58, of the box A47. This spring A80, tends to pull the piece A56, downward and so cause the tooth piece A54, to move from the position shown in Fig. 3 on the lower accumulator group to the position shown in Fig. 3 on the upper accumulator group. The normal position of the tooth A54, is that shown in Fig. 16 and it is maintained in this position by means of the hook A53, engaging the piece A56, and holding A56, in the position shown, under which conditions the spring A81, slides the piece A54, to its upper position. Whenever a wheel A50, by its rotation, causes the cam A51, to pass the end of a hook A52, and raise the same, the pin A18, raises the tail of the hook A53, and depresses the lip of the hook and thereupon releases the piece A56, and a spring A80, thereupon moves the piece A56, into the position shown in Fig. 19, in which position the hook A53, cannot reengage the piece A56. This movement, however, has not affected the location of the piece A54, it being in the position of the part shown in Fig. 16, there being a certain amount of lost motion between the pin A19, and the piece A54. In Fig. 19, it will be seen that the piece A56, is resting in contact with the bar A49. After the wheel A50, has been raised out of engagement with the rack R50, and into engagement with the tooth A54, the bar A49, is dropped to the position shown in Fig. 16, and the tooth A54, can then move a distance of one pitch, as shown in the upper adding wheel in Fig. 3. Thus it causes carrying to be done.

The operation of the bar A49, which is technically known as the carrying bar, is as follows: It is pivoted through side arms to the frame A45, and 45A, by means of suitable pivot screws A16. On a forward extending tail of the piece A49, there is mounted a toggle cam 61A, which cam engages a pin A32, mounted on the side of the cam A59, (see Fig. 20). When the parts are in the position shown in Fig. 16, this cam 61A, and the cam A59, are in the position shown in Fig. 20. When the shaft A1, is rotated to cause the adding wheels A50, to engage the rack R50, the cam A59, is so arranged that the wheel A50, moves during the first part of its stroke, and the pin A32, slides down the dead portion of the cam 61A. After the wheels A50, are in engagement with the rack R50, the cam A59, has a further motion as indicated in Fig. 21—the adding wheel and carrying parts being in the position shown in Fig. 17. In this position, the pin A32, and the cam on the end of the forward arm of the piece A49, act as a toggle, and the carrying bar A49, is moved to its highest position. The cam A59, does not, however, stop at this position, but passes to that shown in Fig. 22, at which point the pin A32, has passed out of engagement with the toggle position of the cam 61A, this being effected through the engagement of an end of the cam 61A, with a stop pin A17, mounted in the side arm of the carrying bar A49, stopping further swinging motion of the cams 61A, and permitting the pin A17, to come into engagement with the second step on the piece A57. This piece A57, is a retaining latch and has two steps for the engagement of the pin A17. The piece A57, is held in contact with the pin A17, by any suitable spring, (not shown) and is provided with a tail extending into the path of a pin A12, on the side of the cam A59, which pin A12, engages said tail when the cam is moved to its normal position as shown in Fig. 20, and moves the latch A57, so that the pin A17, is disengaged from the second step, and falls to the first step, thus permitting the carrying bar A49, to drop to its lower position—the three positions of the bar A49, being clearly shown in Fig. 23; the lowest position being shown in full lines; its extreme upward position by the dotted lines "Y"; and its intermediate position when the pin A17, is in engagement with the latch A57, by the dotted lines "Z." It will thus be seen that whenever a cam A51, is rotated so as to pass a hook A52, it disengages the hook A53, from the piece A56, and the piece A56, through the action of the spring A80, drops to the position shown in Fig. 19 and is held by the carrying bar A49,—the carrying bar being then at the intermediate or "Z" position, as shown in Fig. 23. After the adding wheels A50, are restored to their upper position and in engagement with the tooth A54, the cam A59, causes the pin A12, to operate the latch A57, and drop the carrying bar A49, to its "X" position, whereupon the spring A80, moves both the piece A56, and the tooth A54, into their lower position and so rotates the wheel A50, one tooth.

In taking a total, the usual method is followed as in other machines of this class. The wheels are first brought into engagement with the rack R50, and the racks are then moved until the wheels have been reversed and the cams A51, engage the hooks A52,—at which position further travel of the rack R50, is impossible, and the racks have moved a distance to correspond with the various figures in the total.

*Rack actuators.*—Having described the keyboard and its method of limiting the travel of the racks R50, and the adding devices and their methods of engaging the teeth 50R, of the racks R50, I will next describe the method of moving the racks R50, back and forth in the operation of the machine.

A horizontal shaft R1, extends across the machine and above the racks R50. To this shaft R1, there is secured a bail 45R, which extends across the machine under the racks R50, as clearly shown in Figs. 3 and 4; and extending across between the sides of the bail 45R, there is a bar R51, which serves as the fastening for one end of the springs R81. Mounted so that they can rotate upon the shaft R1, are a series of three-arm cranks R45,—the lower arm having two terminals as before described, and one of these terminals having a pin R14, extending to the left and engaging a vertical slot in the lower side of the rack R50. The object of the double terminal of the lower arm of the crank R45, is to serve as a means of securing the tooth segment R52, thereto, which is done by means of the rivets R13, and R14. To the head of the rivet R13, there is secured one end of the spring R81, and on one side of the lower arm of R45, there is a pin R16, which serves as a fastening for one end of the coil spring R80, the other end of the spring being secured to a vertical horn, extending up from the rack R50, as clearly shown in Figs. 3 and 4. One of these three-arm cranks R45, is provided for each of the racks R50, the lower arm, in each case, extending down vertically along-side of the rack R50, and the horizontal arms to the front and rear converge to the width of the type printing type of the printing section in the manner usual in this class of machines, as shown in Fig. 45; in this way reducing the width of the section from the distance between the extreme columns of keys on the keyboard to the width of the columns of the printing type.

Upon a shaft R2, is mounted, by means of suitable arms R44, an alining bar R93, so arranged that when the shaft R2, is rotated a slight amount, the alining bar R93, can be made to enter between the teeth of the segment R52,—the object of this device being to provide a means for bringing the three-arm cranks R45, to a constant position at the time of printing—this method being known as a device for giving forced alinement to the type, that is, not depending upon the stops K23, in the keyboard for the alinement of the type in adding a column of figures; nor depending, on the other hand, for the alinement in printing totals, on the accuracy of the carrying cams A51. The adding section of the machine is provided with sufficient lost motion in each case to permit the alining bar R93, to bring the type in all cases to instant alinement. A segment R54, is secured to the side arm of the bail 45R, and swings in a path which prevents the alining bar R93, from engaging the teeth of the sector R52, until 45R, is in its extreme rear position, as shown in Fig. 4.

An examination of the drawings Fig. 3 and Fig. 4 will disclose a curious arrangement of the springs R80, and R81. In Fig. 3, which is the position of the machine with the handle in its normal position of rest, the spring R80, is extended and the spring R81, is contracted. If, however, the handle of the machine is operated, and the rack R50, moves to the rear, it will be seen, from an examination of Fig. 4, that the spring R80, contracts, and spring R81, extends, the movement of parts above mentioned causing the pin R16 and the vertical horn on R50 to assume a position nearer together, thereby permitting the springs R80 to contract, and the rivet R13 and the bar R51 assume a position farther apart, thereby causing the spring R81 to extend. The effect of this action is to maintain a relatively constant tension on the rack R50, with a result that there is very little tendency for the rack R50, to rebound when engaging a stop K23, in the keyboard, even when the machine is operated at a very high speed. This arrangement of the two springs also has the effect of equalizing the resistance to the handle pull on its forward and back strokes.

The method of rotating the shafts R1, and R2, will be described in connection with the handle and right-hand side devices.

The forward and rear arms of the pieces R45, connect to and operate the printing device which I will next describe.

*Number printing device.*—The printing device is mounted between two plates P50, and P51, (see Figs. 3, 4, 27, 28 and 29), which plates are secured in the machine directly above the series of three-arm cranks R45. Passing between these plates is a shaft P1, upon which are mounted a series of upwardly extending arms 52P. To the upper end of the arms 52P, there is pivoted about the rivet P11, the type sector P54, as clearly shown in Figs. 3 and 4. These type sectors have a series of ten figures, from 0 to 9, on their peripheries, and a second rivet P10, serves to connect the upper end of a connecting rod P53, which extends to and engages the pin 15R, on the rear end of the three-armed piece R45. From this, it will be seen that if the rack R50, moves to the rear, then it will, through the vertical slot in its lower side, move the pin R14, and so swing the piece R45, about the shaft R1, and cause the pin 15R, in the rear of arm R45, to swing through an approximate vertical arc. The distance the pin 15R, will travel will be exactly proportional to the distance the rack R50, travels; thus, if the rack R50, is in its forward position, the pin 15R, would be in its lowest position, and the type sector P54, will be in a position to cause its upper type to print. This type will be "0". If, however, the rack R50, moves to the rear so as to engage the stop K23, on the keystem K51, it will have moved one-ninth of its possible travel and the pin 15R, will be moved upward a small distance. This distance, however, is sufficient to bring the next succeeding type on the type sector P54, to the position of printing, and it will be figure "1". This position is indicated in dotted lines in Fig. 3. If the rack R50, moves to the rear until it engages the stop K23, on the keystem K54, it will swing the type sector P54, upward until the fifth type or figure "4" will come to the printing position, as indicated in Fig. 4.

Secured to the shaft P1, there is a piece P58, which piece serves as a fastening for one end of the springs P85, the other end of which engages the upward extending arms 52P. Across the upper part of the piece P58, there extends a bar P17. Alongside of each of the arms 52P, there is a flat piece P62, mounted to swing on the shaft P1, the same as the arm 52P. These two pieces 52P, and P62, are held together by means of a rivet P16, and a loop spring P86, which is secured to the piece P62, at both ends and presses against the rivet P16, as clearly shown in Figs. 3 and 4. This piece P62, has on its forward edge three projecting lips for engaging various devices for holding the arm 52P, in its nonprinting position. The lowest of these lips engages the printing trigger 57P, which printing trigger disengages the pieces P62, at every operation of the handle. The printing trigger 57P, extends entirely across between the plates P50, and P51, and engages all nine of the pieces P62,—it is secured to a shaft P2, to the right-hand end of which is mounted a piece P73, (see Figs. 30 and 34) outside the right-hand plate P50. This piece P73, is connected through a round hole in P50, to the printing trigger 57P, by a pin 28P, and is provided with a rearward projecting member having an adjusting screw 22P, for engaging an arm P74, mounted on the shaft P1. The relation between the arm P74, and the piece P73, is such that the shaft P1, turns the piece P58, from the position shown in Fig. 3 to the position shown in Fig. 4 before P74, engages the screw 22P, and causes the piece P73, to be moved and the printing trigger 57P, to disengage the pieces P62. A suitable spring P83, (Fig. 34) returns P73, and the printing trigger 57P, to their engaging positions. The middle lip on P62, is for the engagement of the "0" printing trigger P57. The triggers P57, are held into engagement by the light springs P82, and are normally in engagement with the piece P62; when, however, the three-arm crank R45, is moved from its position of rest, as shown in Fig. 3, the pin R15, on its forward arm engages the "0" printing trigger P57, and moves P57 to a position out of engagement with the piece P62, as shown in Fig. 4. The upper end of the "0" printing trigger P57, is provided with a wing extending to the left and engaging the next succeeding similar trigger so that when any one of the "0" printing triggers P57, is operated by means of the pin R14, it causes all of the other triggers P57, to the right to become disengaged from the pieces P62. The detail drawing Fig. 33 clearly shows this feature. The upper lip on the piece P62, is for engagement with a horizontal sliding piece P67, which piece P67, is operated by hand and is normally not in position to engage the piece P62. Across the space between the two side plates P50, and P51, of the printing section, there extends a rectangular bar P18, which is adjustably mounted to move a small distance back and forth—this adjustment being accomplished by eccentric shaft P19. This bar is known as the rebound bar.

The operation of this printing device would be as follows: Assuming that the horizontal slide P67, is put in its non-operating position: first, the parts would be in the position shown in Fig. 3, key K54, being depressed and the handle operated on its forward stroke, the "0" printing trigger P57, would first be disengaged as shown in Fig. 4. Next, the printing trigger 57P, would be operated and the parts would assume the position shown in Fig. 27, at which position the type would strike the paper on the platen "S." In this position, the small pin P16, would be moved away from its contact with the piece P62, which would slightly extend the rebounding spring P86—the piece P62, being in contact with the rebound bar P18; the spring P85, having contracted and moved the type sector P54, from its normal position to its printing position.. Inasmuch, however, as the spring P86, is much stronger than the spring P85, the type sector P54, would immediately, after printing, assume the position, shown in Fig. 29, with the type slightly withdrawn from the contact with the paper on the platen "S," thus preventing chattering of the type or double printing. The return stroke of the handle of the machine would cause the shaft P1, to be turned in a reversed direction, and the bar P17, would press against the piece P62, and restore the printing device to the position shown in Fig. 3.

*The punctuation device.*—By means of this device, the punctuation of the numbers printed by the printing device just described can be so regulated that the machine will print in United States money, instantly changed to print in plain units, and also to print in plain units with decimals of tenths. It has a further function of regulating the punctuation in discount, and a further function of cutting off the printing entirely so that the machine can be operated for addition or multiplication without printing the series of operations upon the paper. This device is fully illustrated in Figs. 3 and 4 and Figs. 27 to 32 inclusive. In Fig. 3, this device is shown in its normal position and consists of an arm P59, pivoted at P14, to the arm 52P. This arm P59, terminates at its rear end in a type either a comma or decimal point. P59, has a downward extending member terminating in a flattened foot and having a downward projecting lip at its forward end. A third member extends radially from the pivot P14, in an upward direction and is for the purpose of engaging the stationary restoring bar P27. A spring P80, is mounted in a suitable holder P13, on the arm 52P, and has a tendency to turn the piece P59, so that the decimal point will move upward. A hook P61, is pivoted at P15, to the arm 52P, in such a manner that its rear end can engage the foot on the lower end of P59. This is clearly shown in Fig. 3. The hook P61, has a tail extending forward, which tail comes into contact with a sliding piece P67. This sliding piece P67, is shown in detail in Fig. 32, and is provided with three humps a, b, c on its upward extending edge. The tail of the hook P61, normally presses against the flat part of this upper edge, but when P67, is moved laterally so that one of the humps a, b, or c engages the tail of the hook P61, it raises this tail and so depresses the hook, thereby permitting it to disengage the rear end of the foot on piece P59, as is clearly shown in Fig. 28; and as the arm 52P, moves the type sector P54, toward the platen "S," the radial tail on the piece P59, would leave the bar P27, and permit the spring P80, to swing the type on the rear end of P59, to the printing line, and this is determined by the lip on the forward end of the foot at the lower end of P59, engaging the hook P61, as shown in Fig. 29. These three humps a, b and c on the upper edge of P67, are so spaced that they disengage the hooks 61P, mounted on the arms 52P, which would correspond to the punctuation in the number 1,000,000.00, when the piece P67, is in its normal position. If, however, the piece P67, which slides across between the plates P50, and P51, is moved to the right one space, it would bring the three humps a, b and c, one place to the right, and the punctuation would be as in the number 10,000,000.0. This will provide a punctuation with one decimal place, instead of two as is used in United States money. If P67, is moved still farther to the right to its extreme position, then the three humps a, b and c will disengage the hooks P61, so that the figures will be punctuated as follows 100,000,000. In each of the examples given, the entire series of nine printing devices are used. Of course, if the figure printed does not embrace nine figures, only those punctuating devices will print which are on the released arms 52P. The slide P67, is provided with a series of small holes "d," into which a spring detent P81, (Fig. 34) engages and a small knob 10B, is mounted on the outside of the case on a suitable slide with an index, and engages the slide P67, and enables the operator to locate it laterally. When the tail of the hook P61, rests against the flat part of the slide P67, it does not disengage the foot on the piece P59, with a consequence that when printing takes place, the type on the rear end of P59, assumes the position shown in Fig. 27, and does not come in contact with the paper about the platen "S." When the arm 52P, is restored to its normal position, the upper extending member of P59, engages the stationary bar P27, and restores the arm P59, to the position shown in Figs. 3 and 4.

When it is desired to use the adding mechanism of this machine without operating the printing device, the small knob 10B, is moved to the left until the index point on its slide comes opposite the letter "X." This causes the lower part of the slide P67, to come into the path of the upper lip on the piece P62, as clearly shown in Figs. 3 and 4, in which position P67, serves as a stop which would prevent any movement of the piece P62, in a rearward direction through the action of the springs P85, and this irrespective of the operation of the printing hook 57P, or the "0" printing trigger P57, so that multiplication can be performed on the adding device or any other calculation desired, without in any way affecting the record as printed on the paper, and when it is desired to print the result of these computations, it is only necessary to return the knob 10B, to its normal position or such position as is desired.

*Discount.*—Whenever it is desired to figure a discount or do any other calculation which involves the multiplication of one number by a number terminating in a decimal fraction, thereby causing it to become necessary to place the decimal point as many figures to the left of the normal position as there are figures to the right of the decimal point in the multiplier, the knob 10B, is moved to the left until the pointer comes opposite the figure on the scale corresponding to the number of decimal places so pointed off. This results in moving the slide P67, to the left, and progressively moving the three humps $a$, $b$ and $c$ to the left as many of the printing segments as there are places which we wish to count off. The lower projecting edge of the slide P67, which has the detent holes "$d$," in it proceeds to intercept the right-hand type sectors by engaging the pieces P62,—the distance from the edge of the piece P67, which engages the arms P62, to the hump "$c$" always representing two of the type sectors. Thus, if it is desired to obtain the net amount after deducting 6% from $2,436.75, this amount would be multiplied by 94 in the usual way giving a result of $229,054.50, but, by moving the knob 10B, two places to the left, we cut off the right-hand "5" and "0" and move the punctuation two places to the left so that the figure printed as the net amount is $2,290.54. By this method, any amount less than one cent is disregarded in the final result. Of course, if there are more than two figures to the right of the decimal point in the multiplier, the knob 10B, would be moved farther to the left so that the pointer comes opposite the third figure or fourth figure of the scale, and it will be seen that the capacity of the machine would extend up as high as eight figures.

Having described the three principal sections of the calculating and number printing devices of this machine, as shown in Figs. 3 and 4, and their connecting members—that is the keyboard, which serves to set the machine for a definite operation; the adding device, which accumulates the result of the amount set up on the keyboard, and the printing device, which records the operations—first, of the amounts set up on the keyboard; and second, the totals as set up by the adding device, it is evident that these three sections of the machine constitute the means for performing the principal functions of the entire device. The operation of these three sections, after the setting of the keys, is accomplished through the partial rotation of the horizontal shafts O1; R1; R2; P1; and A1, and 1A. These shafts may be divided into two classes: first, those which have a regular or constant movement at every operation of the machine, independent of whether the operation calls for a total or the adding of a figure; second, those shafts which have a movement at one time for the adding of figures, and at a different time for the giving of totals. Of these shafts all but A1, and 1A, belong in the first class. A1, and 1A, come under the second.

*The right side.*—I will now describe the mechanism for moving the shafts of the first class, that is those which have a constant motion in relation to the operation of the handle O58, on the side of the machine. This mechanism is clearly shown in Figs. 39 and 40, and is mounted on the outside of the right-hand frame B46, of the machine. It pertains to the handle O58, and its operative connections to the various shafts aforesaid.

The requirements of a modern adding machine necessitate the applying of power through a flexible connection in such a manner that the handle or other operating member may be moved at a speed entirely independent of the operation of the machine. In common practice, the handle is connected to the operative parts by a series of springs, so that when the handle is moved from one position to the other, it puts a tension on these springs, which in turn move the operated members of the device. These operated members are in some manner connected to a suitable governor, which regulates the speed at which they may move, and the handle or its equivalent has some device which causes the handle to remain in its extreme position until such time as the operated device has completed its stroke, at which time the handle and the operated device return to their normal positions together. The ordinary device of this kind, however, makes no provision for maintaining a constant speed of the operated parts when the handle is moved slower than the speed at which the governor for the operated parts is set, and this in practice is found to have certain objections—one of these objections being that it gives time for the manipulation of certain other parts of the machine, such as the keys during the forward stroke of the handle, thereby changing the setting of the machine during its course of operation; and in many machines this causes the mechanism to lock and prevent the further use of the machine until it is untangled—this often being a difficult and time-consuming task. In the device shown in Figs. 39 and 40, this objection is overcome by arranging the mechanism so that the forward stroke of the operated parts is timed exclusively by the governor. The forward stroke of the handle O58, first causes the mechanism to be unlocked and the operating springs immediately carry the operated device through their forward movement at the speed determined by the governor. The handle may be moved either faster or slower than the operated parts. If it moves faster, it must remain in its extreme forward position until the operated parts catch up, and if it moves slower, the operated parts remain in their lower position until the handle overtakes them, and they return together.

Referring to the Figs. 39 and 40, O58, is the handle mounted on, but not secured to the shaft O1. An irregular plate O50, is secured to the hub of the handle O58, so that O50, and the handle move together. A full-stroke pawl O91, is maintained in its normal position by a suitable spring O81, and engages a toothed segment O67, during the progress of its travel. It is free from engagement with the segment O67, in its normal position, as in Fig. 39, so that it can reverse itself for the next forward stroke, but is held in a tilted position at the forward end of the stroke, as shown in Fig. 40, by the extending hook on the lower end of the segment O67. This extending hook prevents the repeated vibration of the pawl O91, which vibration, in rapid operation of the machine, would cause the pawl to lock on the beginning of the return stroke, requiring a second touching of the handle before it would return. The pawl O91, is further used as a lock for the handle O58, in this machine in the following manner: A lever 51O, is pivoted on the side frame B46, and engages a pin 11O, mounted to side of the center of the pawl O91. An upward extending member B56, terminates in a small roller B36, which is in contact with the carriage C45, of the machine. This roller, in its normal position, is shown in Fig. 39, and holds, through the lever B56, the lever 51O, out of engagement with the pin 11O, on the side of the pawl O91. But after the carriage is moved out of the path of the roller B36, it permits the spring O88, to cause the lever 51O, to bear on the pin 11O, on the side of the pawl O91, and tilt the same so that the end of the pawl O91, engages the corner of the plate O67, and forms a block to the further travel of the plate O50, and handle O58. Secured to the shaft O1, and just back of the plate O50, there is a second irregular plate O51. Some distance forward of the shaft O1, there is mounted a two-armed lever O57, upon a suitable stud O15, secured to the side frame B46, and a similar arm 57O, is secured on a similar pivot some distance to the rear of the shaft O1. In the drawings, these two pivots O15, and 15O, are not diametrically opposite the center of the shaft O1, but this irregularity is of no particular consequence. The levers O57, and 57O, are not pivoted in their middle. Each is pivoted with a long arm and a short arm, the upper arm of the lever O57, being longer than the lower, and the lower arm of 57O, being longer than the upper. A coil spring O80, extends and is connected between a stud O13, mounted on the piece O50, and the lower end of the lever O57. A similar spring 80O, is connected at one end to a stud 13O, mountd on the piece O50, and extends and is connected to the upper end of the lever 57O. Connected to the upper end of the lever O57, is a link O56,—the other end of which is connected to the piece O51. A similar link 56O, connects the lower end of the lever 57O, to the piece O51, which connections are all clearly shown in Figs. 39 and 40. Upon the upper part of the plate O50, is pivotally mounted a hook O53. This hook O53, engages a lip on the left-hand end of the piece O51, and is held in engagement by the spring O82. A small lever O55, is pivoted in a suitable position on the side frame B46, to engage a projecting wing O54, of the hook O53, and the lever O55, is held in its normal position by a suitable spring O83.

The operation of this device is as follows: The normal position of the parts at rest is indicated in Fig. 39—suitable means being provided in the form of stops O92, to prevent further rotation of the parts to the right. The handle O58, is moved in its forward direction and causes the wing O54, of the hook O53, to engage with the upper end of the lever O55, which offers a resistance to the forward movement of the hook O53, and causes the same to disengage from the lip of the plate O51. The plate O51, on the shaft O1, being released, immediately moves to the position indicated in Fig. 40, which is the other extreme end of its travel, a suitable stop O94, being provided to limit its travel in this direction. The cause of this movement of the plate O51, is the contraction of the springs O80, and 80O,—the studs O13, and 13O, being secured to the piece O50, (which only moves with the handle O58,) remaining comparatively stationary. The springs O80, and 80O, pull on the levers O57, and 57O, and through the links O56, and 56O, rotate the piece O51, to the position shown in Fig. 40. The handle O58, may be held either stationary immediately after the disengagement of the hook O53, and the plate O51, or it may be drawn forward while the plate O51, is in course of its movement. When the handle O58, is drawn forward to its extreme position, as shown in Fig. 40, the hook O53, will come forward with it, until a small wing on its under side, similar to O54, engages the pin O21, mounted in the side frame B46, which causes the hook O53, to swing backward under the influence of the spring O82, and reëngage the lip on the end of the piece O51. When the handle O58, is in the position shown in Fig. 40, the springs O80, and 8OO, are extended to their maximum length. This tension on the springs O80, and 8OO, causes the mechanism to be in a state of unstable equilibrium, and on releasing the handle O58, the springs O80, and 8OO, are partially contracted, and cause the parts to assume the positions indicated in Fig. 39, in which position the operation of the handle is ready to be repeated.

Connected and secured to the end of the shaft P1, is a crank O60, extending in a forward direction, and the forward end of the crank O60, is connected by a link O61, to the plate O51, so that when the plate O51, moves from the position shown in Fig. 39 to the position shown in Fig. 40, the link O61, moves the crank O60, and partially rotates the shaft P1, which causes the printing device to be operated. On the return stroke of the handle O58, the plate O51, resumes its normal position, as shown in Fig. 39, and the crank O60, is returned to its normal position.

The irregular piece O51, has a rearward extending member, terminating in a roller O28, which roller works in the slot of an irregular cam O62, secured to the end of the shaft R1. This irregular cam O62, is designed so that the distance from the lower end of the slot to the point marked "x" is made concentric with the center of the shaft O1, so that the movement of the piece O51, from its position, as shown in Fig. 39, until the roller O28, comes to the place marked "x", will not cause any rotation of shaft R1. From "x" to the place marked "y", the cam is not concentric with the shaft O1, and the roller O28, causes the cam to move backward into the position shown in Fig. 40. In this position, that portion of the cam slot between the letter "y" and the upper end of the slot is again concentric to the shaft O1. From this, it will be readily seen that the movement of the roller O28, is co-incident with the rotation of the shaft O1, but the rotation of the shaft R1, takes place in the middle of the movement of the shaft O1, there being a dead space in the movement of the cam O62, both at the beginning and at the end of the time during which the shaft O1, is moving. The object of this irregularity in the time of travel of the shaft R1, is to provide time for the operation of the adding mechanism either before or after the movement of the racks R50, as the case may require, the movement of the shaft R1, causing the movement of the racks as before described.

Upon the end of the shaft R2, is secured an upright cam O64. The arm O63, and the cam O64, are held in their relative positions by means of a spring O87, connecting the two together, and a stud 22O, mounted in the cam O64, which presses against the side of the arm O63. The end of this cam O64, extends into the path of travel of the roller O28, when it is moved between the point marked "y" and the upper end of the cam slot, and this engagement results in a slight rotation of the shaft R2, to the right, thereby causing the alining bar R93, to perform its function. The object of making the cam O64, a separate piece from the arm O63, and connecting the two by a spring O87, is to provide a yielding connection to operate the alining bar R93,—it always being possible that this alining bar may strike one of the teeth of the alining racks R52, end on, and if there was no flexible connection between the cam O64, and the alining bar R93, injury would result to the machine. The cam O64, is held in its normal position by a suitable spring O85.

The speed at which the shaft O1, may be operated is determined by a suitable governor and this is fully shown in Figs. 41, 42, 43, 44 and 45.

*Description of governor.*—The location of the governor is on the inside of the forward part of the left-hand side frame B47, as shown in Fig. 45—this being the most available space in the construction shown, though the device could be placed as effectively in a number of other locations, provided there was sufficient room. The governor consists primarily of a hollow, cylindrical box D46, into which is screwed a tight-fitting cover D47. The inside of this cylindrical box D46, is half filled with solid segments D48, and D49, each segment being 90°, and the two being placed opposite each other. Through the segment D49, there extends an open passageway connecting the two hollow chambers on its opposite sides, and through the segment D48, is a similar passageway, which, however, is intercepted by a valve which can be adjusted so as to permit any desired amount of opening of this passageway. This valve consists of a cylindrical hole bored into the segment D48, radially from the outside, and into this hole there fits a plug 25D, having a suitable notch in one side arranged to coincide with the passageway through the segment, as clearly shown in Fig. 44. This plug 25D, is capable of being rotated by means of a screw 26D, engaging a worm thread around its outer edge. This screw 26D, comes opposite a small boss on the back side of the governor body D46, which small boss has a hole through its center and is closed by a suitable screw 27D. It is evident that by the removal of the screw 27D, a screwdriver may be inserted in the hole and engage a screw-slot in 26D. On turning the same, it will cause the valve 25D, to rotate and either open or close the passageway through the segment D48. Through the center of the cover D47, there extends a shaft D1. A suitable stuffing-box D42, surrounds this shaft, and the shaft D1, is slotted at its inner end to receive a vane 52D, which is of the same length as the internal diameter of the governor body D46. Inasmuch as this vane 52D, is secured to the shaft D1, it is evident that the shaft D1, can have a rotation through an angle of 90° only, also that after the hollow spaces in chambers on the side of the segments D48, and D49, are filled with a liquid, that the rotation or partial rotation of the vane 52D, will cause this liquid to pass through the passageways in D48, and D49, and the adjustment of the size of the passageway D48, will regulate the speed at which the liquid can pass from one side to the other of the segment D48. On the end of the shaft D1, there is fixed a suitable crank 51D, which, by a link 50D, is connected to a crank 50O, on the shaft O1. This linkage is clearly shown in Fig. 41 and Fig. 45. It is evident that the shaft O1, can turn as fast as the governor shaft D1, and no faster, and inasmuch as the small boss, terminating in the screw 27D, extends into or through the side frame B47, it is quite accessible for adjustment from the outside of the machine. If the handle O58, is operated in less time than the governor permits the shaft O1, to rotate, the hook O65, which is loosely pivoted on the stud O17, will engage the lip marked "b" on the right-hand member of the irregular plate O50, and thus prevent the handle O58, from returning to its normal position, holding the handle in the position shown in Fig. 40 until the roller O28, on the piece O51, completes its stroke, and at the upper end of its travel engages a cam surface on the piece O66, which is made fast to the hook O65. This engagement of the roller O28, moves the hook O66, into the position shown in Fig. 40, and releases the hook O65, from engagement with the lip "b" on the piece O50, thereby permitting the handle O58, to return to its normal position. A second lip, marked "a," on an upward extending member of the piece O50, serves as a means of engagement for a hook 52O, which is mounted on the stud O17. This hook 52O, is provided with a small pin 24O, in one side, which engages a slot in the end of the crank O52, mounted on the end of the shaft L1, and a light spring O84, extending between the crank O52, and the hook O65, serves to operate both the hook O65, and through means of the pin 24O, the hook 52O. The rotation of the shaft L1, to the left for a short distance serves, by means of the crank O52, to raise the hook 52O, out of engagement with the lip "a" of the piece O50. The means for rotating the shaft L1, will be more fully described with the left-hand operating parts. Suffice it to say here that the machine is normally locked so that the handle O58, cannot be operated; and only when the carriage is in the proper tabulating position, or the proper keys on the keyboard are depressed, does the shaft L1, rotate and cause the hook 52O, to unlock the handle O58.

*The left side.*—The mechanism on the outside of the left-hand side frame B47, is devoted to the operation of those shafts and other moving parts of the adding machine, whose functions are irregular and whose timing is not constant. In Fig. 46 will be seen a right elevation of the left side, showing the parts as they appear completely assembled. Owing to the large number of pieces, and the fact that they over-lap each other so frequently, but few of these parts are numbered. In the succeeding Figs. 47 to 58 inclusive, different combinations of these parts are shown grouped together in a comparatively small number in order to be more intelligible.

The principal functions of the left side are, first, to unlock the handle O58; second, to operate the accumulators in proper time; third, to release the keys—both numeral and operating; and fourth, to unlock the operating keys in the proper time.

The term "operating keys" is here applied to the nine keys shown in Fig. 46, numbered K61, to K69. This row of nine keys is the same as shown in Fig. 2 on the extreme left-hand side of the keyboard. They are called "operating keys" because the depression of any one of them in conjunction with the operation of the handle O58, causes the machine to perform some special function, or fail to perform any function whatever. These nine keys are, first, K61, a release key which serves when depressed the purpose of releasing any of the numeral keys which may be depressed or any other of the operating keys which may be depressed; K62, is a repeat key—its function being to prevent the release of the numeral keys by operation of the handle, as is customary in this class of machine; K63, is the total key for the upper set of accumulators; K64, is the sub-total key for the same set of accumulators; K65, is the adding key for the upper set of accumulators; K66, is the total key for the lower set of accumulators; K67, is the sub-total key for the same set of accumulators; K68, is the adding key for the lower set of accumulators; K69, is the non-add key. These nine operating keys K61—K69, inclusive, are arranged close to the side frame B47, and are guided at their upper end by suitable slots in the top plate K50, and are guided in similar slots between the side frame and the bar K91, at their lower end. Each keystem is provided at its lower end with a suitable spring K81, which presses against a small shoulder in the keystem and against the bar K91. In the construction of a machine of this character, having a plurality of total keys operating on different sets of accumulators, it becomes desirable to so arrange the mechanism that only one of these total keys can be brought into engagement to connect with the printing device at a time. Therefore, the total keys and sub-total keys are made interlocking—that is, arranged so that when one of these keys is depressed the others are locked up in their non-operating position. In the present device, it is also desirable to make the non-add key K69, also interlocking with these total keys, and this is accomplished in the following manner: Referring to Fig. 47, a series of small, dangling pieces L50, are pivoted in the side frame B47, between the keystems K63—K64—K65, etc.—one being placed to the left of the keystem K69. A lever D69, is pivoted at their left-hand end in such a manner that one end of the lever D69, can engage the danglers L50. These danglers are of such a width that a rivet K12, on the keystem, coming between them, will cause them to spread to the right and left until they engage the other rivets K12, on the other keystems and the lever D69,— in this way preventing the depression of more than one of the keystems K63,—K64,—K66,—K67, and K69. The lever D69 is normally held in the position shown in Fig. 47 by a pin D14 (see Fig. 49), passing through the plate D50, on the shaft O1. When the plate D50, is in the position shown in Fig. 46, this pin D14, engages a small outturning lip on the left-hand end of the lever D69. When the shaft O1, is operated so as to cause the pin D14, to leave the lever D69, the spring D81, moves the lever D69 to a horizontal position which swings all the danglers L50, to the right, their right sides engaging all the pins K12, which form stops for them. This will close the passage between them and in this way prevent any of the keys K63,—K64,—K66,—K69, from being depressed.

The accumulating mechanisms of this machine are brought into engagement for the purpose of adding by two entirely separate means. One method is by the tabulation of the carriage. The other method is by the depression of the adding keys K65, and K68,—the operating handle of the machine O58, being normally locked against any movement by the hook 52O. It is evident that the machine can only be operated by the disengagement of this hook 52O, and this is done both by the tabulating mechanism and by the adding keys K65, and K68. When the machine is adding by means of the tabulating device, the hook 52O, is unlocked in the tabulating position only, and if the carriage be spaced as much as one space to the right or left; the hook 52O, is brought into engagement and locks the handle O58. Whenever the adding keys K65, or K68, are depressed, the hook 52O, remains disengaged until the adding key is released. The result of this is that the machine will add in tabulated columns of figures by means of the tabulating stops on the carriage; but when it is desired to perform lineal addition, the adding keys K65, or K68, must be depressed.

*Adding by carriage tabulation.*—Referring to Fig. 56, we see an isometric view of those elements which operate the carriage tabulating device and connect one of the sets of accumulators. This mechanism consists of two elements which are adjusted and operated by hand. First, is a sliding stop C96, mounted on a suitable rack C91, which travels with the carriage. This is clearly shown in Fig. 1 and Fig. 2. The means for bringing this device into engagement is the tabulating key K10, also shown in Fig. 2. The key K10, passes through the top plate K50, and engages a lever F67, which is connected to a diagonal pivot F29, from which extends an arm F58, at right angles to the lever F67. A small rivet 14F, at the end of the arm F58, engages a slot in one end of the lever F50, pivoted at F11. From this construction, it is evident that a depression of the key K10, will depress the left-hand end of the lever F50, and elevate the right-hand end. The lever F50, serves to raise the carriage abutment F73, which comes into the path of stop C96. A small finger extending from the left-hand end of the lever F50, engages a pin F13, on a vertical sliding bar F70, the lower end of which bar F70, engages a bell crank F51, pivoted at F14, whose upper end is connected to a rod F52. This rod F52, extends to the rear of the machine and serves the purpose of disengaging the escapement of the carriage—all of which is done in a manner usual in typewriting machines. When the carriage has been permitted to escape until the stop C96, has come into engagement with the abutment piece F73, the key K10, is released and immediately causes the abutment piece F73, to descend, and permits the sliding piece F70, to rise and thus permit the connecting rod F52, to disengage the escapement, which immediately resumes its normal position and holds the carriage from further movement. In this position a small V-shaped point "*t*" extending downward from the stop C96, engages an upward extending point "w" at the right-hand end of a lever F61, which is pivoted at F25. This lever F61, at its left-hand end engages the upper end of a vertical link D64,—the lower end of which is connected to the piece D60. It is evident from the drawing that if the carriage be permitted to move one space either to the right or left, the two V-shaped points "t" and "w" will no longer engage each other, and thus will permit the lever F61, to move to its normal position with the point "w" up and the connecting link D64, down. With this mechanism in mind, refer to Figs. 49, 50, and 57. To the end of shaft O1, there is secured the plate D50, and on this plate there is pivoted at D14, the flying lever D53. The upper end of the flying lever D53, is connected by the link D56, to the lower end of the crank A67, and the connection between the link D56, and the flying lever D53, serves also as a pivot for the hit and miss piece D51. Pivoted to the side frame B47, is a lever D58, from the upper end of which extends outwardly a pin D21. This pin D21, extends into the path of the upper end of the hit and miss piece D51. The lower end of the lever D58, is provided with a notch for engagement with the left-hand end of the piece D60.

Whenever the stop C96, on the carriage is not in tabulating position, and as a consequence the connecting link D64, is not raised, the lever D60, assumes the position shown in Fig. 49 and its left-hand end engages the notch in the piece D58, causing the pin D21, to interpose in the path of the upper end of the hit and miss piece D51, after the shaft O1, is operated and the plate D50, is moved into the position shown in Fig. 49. This engagement of the upper end of the piece D51, with the pin D21, causes the lower end of the hit and miss piece D51, to miss engagement with a square projection D12, on the side of the plate D50. As the accumulator crank A67, is held in its normal position, as shown in Fig. 49, by a slight spring detent A69, the movement of the plate D50, does not through the flying lever D53, and the link D56, cause any movement of the accumulator crank A67, whatever. If, however, the tabulating stop C96, is brought into engagement, it causes the link D64, to move the piece D60, into the position shown in Fig. 50. Pivoted to the side frame B47, is an irregular cam piece D67, provided with three radially extending members— one member extending upward, and to the left engages the piece D66, which is forked at its upper end to engage the pin D21. To the right, there extends a member of the piece D67, which has an irregular cam opening from its end. This irregular cam engages the back side of the pivot D14. When the plate D50, is in the position shown in Fig. 50, the pivot D14, engages the cam slot in piece D67, and through D66, moves the pin D21, so as to bring the piece D58, where the notch on its lower end is free to engage with the left-hand end of the piece D60. This freedom to engage the lever D60, will cause the pin D21, to remain in its upper position whenever the link D64, is in its lower position, and when the pin D21, is in its upper position, it causes the hit and miss piece D51, to engage with its end, this in turn causes the lower end of the piece D51, to miss the square projection D12, on the plate D50. If, however, the connecting link D64, is in its raised position, it will cause the left-hand end of the piece D60, to descend out of the path of the notch on the lower end of the lever D58, and so permit the pin D21, to move in a downward direction, as shown in Fig. 57. In this position, the movement of the plate D50, will bring the square projection D12, in contact with the lower end of the hit and miss piece D51, and so stop further rotation of the flying lever D53, about its pivot D14. When this condition takes place, the flying lever D53, becomes a rigid extension of the plate D50, and through the link D56, moves the adding crank A67, to the position shown in Fig. 57. An inspection of the drawings of the Figs. 49, 50 and 57 will disclose that this motion of the adding crank A67, does not take place until the latter part of the travel of the plate D50,—in fact the motion does not take place until the shaft O1, has moved to such a position that on the right-hand side the roller O28, has passed the position "y" in the cam O63, which is the proper timing for the operation of the adding mechanism. On the return stroke of the shaft O1, the square projection D12, on the side of the plate D50, leaves the lower end of the hit and miss piece D51, and the flying lever D53, is swung to the left on its pivot D14,—the detent A69, being sufficient to maintain the adding crank A67, in its forward position. This is maintained until the other square projection D13, on the plate D50, engages the forward side of the flying lever D53; when the flying lever again becomes rigid with the plate D50, and through the link D56, moves the adding crank A67, to its normal position. This engagement of the projection D13, with the flying lever D53, does not take place on the return stroke of the shaft O1, until the roller O28, on the right-hand side has reached the position "x" in the cam O62, at which position the racks R50, and the printing mechanism have assumed their normal positions. From this description, it is evident that the adding mechanism will operate every time the handle O58, causes the shaft O1, to turn; while the piece D60, is in the position shown in Fig. 57 so that it does not engage the piece D58, and thereby hold the pin D21, in the path of the hit and miss piece D51.

The mechanism for operating the lower set of accumulators is in all respects similar to that which is described for operating the upper set of accumulators. The various pieces may be seen in their positions on Fig. 46.

The unlocking of the handle O58, by the engagement of the stop C96, with the lever F61, when in the tabulating position is accomplished as follows; (see Figs. 47 and 48.) The shaft L1, extends between the right-hand side frame B48, and the left-hand side frame B47, terminating at the right-hand side in the lever O52. At the left-hand end of the shaft L1, there is an irregular piece 51L, secured to the shaft. This piece 51L, has two projections extending to the left and one extending to the right and rotatably mounted on the shaft L1, on the outside of the piece 51L, is a piece 50L, which is held in a constant relative position to the piece 51L, by means of a spring 81L, and a pin 15L, inserted in the piece 50L. The two left-hand projecting members of the piece 51L, are in engagement with the two studs D27, which forms the connection between the link D64, and the pieces D60, and D28. From an inspection of Fig. 47, it is evident that if the link D64, is raised, the pin D27, will engage with the upper member of the piece 51L, and so rotate the shaft L1, to the right and through the arm O52, engaging the pin on the side of the hook 52O, cause the hook 52O, to disengage the handle plate O50. After the handle O58, has reached its extreme forward position in an operation of adding and is ready to begin its return stroke to its normal position, the numeral keys have completed their functions in the process of addition, and such as have been depressed are ready to be released. This is accomplished in the following manner:

*Numeral key release.*—The lower member of the cam piece D67, is connected to a horizontal bar D68; the forward end of which is provided with a slot and slides on a screw L10, (see Figs. 52-55). This sliding bar D68, is provided at its forward end with two projecting pins L14, and L15, which pins are arranged to engage with certain cams as follows: A three-armed lever L52, is pivoted on the screw L10, which screw L10, is secured into the side frame B47,—one arm of the piece L52, extending backward, has pivoted near its end the irregular cam piece L63. The forward projecting arm of L52, has pivoted near its forward end the cam piece 63L; and the upward extending arm of L52, is connected to the piece L51,—the forward end of which is provided with a slot, and is held in position by a suitable stud 11L, passing through this slot into the side frame B47. This piece L51, is provided with a downward extending surface "*f*", which engages one arm of a horizontal bell crank L53. (See Figs. 51 and 5). This horizontal bell crank is mounted on a small rectangular projection extending inward from the side frame B47, and its forward extending arm engages with a pin 17K, on the left-hand end of the bar 66K. From this construction, it is evident that if the outward extending arm of the bell crank L53, is moved toward the rear of the machine, the forward extending arm will cause the bar 66K, to move to the left, and in this way disengage all of the key latches 52K, from engagement with the numeral keys, as shown in the drawings of the keyboard section. When the handle O58, is at its normal position of rest, the connections between the bar D68, and the piece L51, are shown in Fig. 52. When the handle O58, is moved to its extreme forward position, the piece D68, is moved to the position shown in Fig. 53—the pin L14, passing over the cam L63, and in doing so depresses the cam against the tension of the spring L80. This spring L80, is not of sufficient strength to overcome the resistance of the latch springs in the keyboard—therefore the piece L51, does not move. On the return stroke of the handle O58, the bar D68, is moved back to its position as shown in Fig. 52, and the pin L14, engages the cam L63; in so doing, it causes the tail of the cam L63, marked "*x*" to press against the screw L10. Inasmuch as the screw L10, is fixed in the side frame B47, the movement of the pin L14, to the left causes the cam L63, to be depressed, and so depresses the left-hand end of the three-armed lever L52, which moves the piece L51, to the left and, through the bell crank L53, causes the bar 66K, to release the numeral keystems.

*Operation of adding keys.*—As there are occasions when it is desirable to cause the accumulator mechanism to become operative independent of the tabulated position of the carriage, keys are provided, which on being depressed, will cause the accumulator mechanism to be constantly in engagement until such keys are released. By this means, lineal addition may be accomplished and such other computations may be performed where two sets of accumulators are used either separately or simultaneously as the case may require. This mechanism is clearly shown in Figs. 49, 50 and 57. The adding key K65, has near its upper end, just under the top plate K50, a suitable notch "*n*", facing to the rear; and a lever L57, is pivoted to the side frame B47,—the upper end of L57, being turned in at right angles in order to form a latch for engaging the notch "*n*" in the keystem K65. A suitable spring holds this lever L57, so that the bentin end will bear against the back side of the keystem K65. The left-hand end of the lever L57, is provided with a small pin L23, which engages the right-hand end of the piece D60, so that when the key K65, is depressed, and L57, engages the notch "n", the pin L23, will elevate the right-hand end of the piece D60, as shown in Figs. 50 and 57, and this will bring about the same combination of parts as though the link D64, had been elevated through the action of the carriage and tabulating key. The operation of the parts after the engagement of L57, with the key K65, is in all respects identical with the operation as before described, which takes place through the action of the piece D64. The mechanism for controlling the operation of the lower accumulators with the key K68, is in all respects similar to that which controls the upper accumulators by the key K65, and the parts may be followed in their positions on Fig. 46. In this connection, it may be said that either or both of the keys K65, or K68, may be depressed, and when depressed the operation of the vertical links D64, is rendered negative.

*Totals.*—Totals are taken on this machine in the following manner, (see Figs. 58 and 59:) The total key K63, is depressed, and when depressed, a lever L56, pivoted into the side frame B47, and which has a right angle bend at its upper end, extending across the rear face of the keystem K63, engages the notch "n" near the upper end of the keystem. In so doing, it locks the keystem K63, in its depressed position and moves its lower end so that the pin L19, which is near its lower end, rides up onto the cam on the end of the piece 58L, and so depresses this piece, moving it from the position shown in Fig. 46 to the position shown in Fig. 58. The piece 58L, is mounted on a pivot L24, in the side frame B47, and is held in a constant position in relation to the piece 60L, by means of a stiff spring extending between the two pieces 58L, and 60L; and a suitable pin L22, mounted in the piece 60L. When the piece 58L, is depressed, the extreme left-hand end of the piece 60L, is elevated to the position shown in Fig. 58 and comes in front of the lower end of the flying lever D53. With the parts in this position, the left-hand end of the piece 60L, offers a firm resistance to the movement of the flying lever D53, when the plate D50, is revolved. Therefore, the first part of the movement of the plate D50, causes the flying lever D53, through the link D56, to operate the adding crank A67. This movement of the adding crank A67, takes place during that part of the rotation of the shaft O1, which moves the roller O28, on the right-hand side between its extreme position, as shown in Fig. 39, to the position marked "x" in the cam O62; at which time the circular path of travel of the pivot D19, of the flying lever D53, has dragged the lower end of the flying lever D53, past the end of the piece 60L, so that it no longer has any effect on the adding crank A67. Pivoted at 19L, to the side of the piece 60L, is a curved piece L62. This piece L62, is provided with a small pin 20L, extending underneath the piece 60L, and a spring L82, is so connected as to hold the piece L62, in the position shown in Figs. 58 and 59, with the pin 20L, pressing against the bottom of the piece 60L.

As the pivot D14, of the flying lever D53, makes a circular travel from the position shown in Fig. 58 to the position shown in Fig. 59, and inasmuch as the adding crank A67, has made its full travel and is stopped by means within the adding mechanism, the lower end of the flying lever D53, is caused to pass over the upper end of the piece L62, slightly depressing this piece against the tension of the spring L82, in so doing, and the pieces then assume the position shown in Fig. 59. On the return stroke of the handle O58, the movement of the pivot D14, of the flying lever D53, causes the lower end of the flying lever D53, to press against the upper end of the piece L62. This pressure, however, is almost in a direct line with the pivot 19L, and consequently has no tendency to swing the piece L62, about the pivot 19L, but serves as a solid obstruction to the movement of the lower end of the flying lever D53. The result of these conditions is that the connecting link D56, moves the adding crank A67, back to its normal position at the beginning of the return stroke of the plate D50, and of the handle O58. This movement of the adding crank A67, taking place in that part of the return stroke of the handle O58, which moves the roller O28, on the right-hand side between its extreme upper position and the position marked "y" in the cam O62. After the movement of the adding crank A67, the flying lever D53, drags over the upper end of the piece L62, and assumes its normal position, as shown in Fig. 58. On the return stroke of the handle O58, it is, however, desirable to release the total key K63, and this is accomplished in the following manner: A sliding bar L66, is mounted on a swinging cam L54, at its forward end and over the stud L27, near its rear end. This sliding bar L66, has a suitable projection "p" on its upper edge, arranged to engage the upper end of the piece L56, as shown in Fig. 58, so that if the piece L66, be moved to the rear, it will swing the piece L56, about its pivot and so release the keystem K63, and incidentally disengage the pin L19, from the cam on the end of the piece 58L. This movement of the piece L66, is accomplished as follows: On its extreme rear end, there is pivoted a lever L67, which is held in the position shown in Fig. 58 by a light spring L84. On the back side of the plate D50, there extends a square rivet 13D, and the path of travel of this rivet 13D, is intersected by the lower end of the lever L67. On the forward stroke of the handle O58, and the forward movement of the plate D50, the interference of the rivet 13D, and the piece L67, simply turns the piece L67, to the left and in no way effects the release of other pieces. On the return stroke, however, of the plate D50, the rivet 13D, engages the forward side of the lower end of the lever L67, and swings it until the upper end of L67, engages the pin L29, mounted in the side frame B47. Further movement of the rivet 13D, causes the lever L67, to move the sliding bar L66, to the rear and so causes L66, to release the total key K63. Inasmuch as this action takes place prior to the time when the lower end of the flying lever D53, engages the end of the lever 60L, the movement of the lower end of the flying lever D53, does not contact with the end of the piece 60L. In this same way, totals are taken by action of the total key K66, for the lower set of accumulators, being in all respects identical with that for the upper accumulators, and the same bar L66, operates to release both of the total keys K63, and K66.

In the operation of taking a total, it is always necessary in this type of machine to release any numeral keys which may be depressed prior to the beginning of the movement of the rack R50, and this is accomplished in the following manner, which can be understood by noting Figs. 49, 50, 52, 53, 54, 55, and 57: An irregular piece L64, is pivoted to the side frame B47. This irregular piece L64, is provided with a notch at its forward end which engages a pin 22L, on the side of a pivoted cam 63L, mounted on the forward end of the three-armed lever L52. This cam 63L, is in its normal position when the machine is performing addition, as shown in Figs. 52, and 53, with the point of the cam sufficiently elevated that the stud L15, in the forward end of the piece D68, passes back and forth without engagement. If, however, the stud 22L, be depressed to the position shown in Fig. 54 and held there, then the movement of the stud L15, as the piece D68, moves back and forth, will engage the cam 63L, and as a consequence will raise and lower the forward end of the three-armed crank L52. As this raising of the forward end of L52 would take place on the forward stroke of the handle O58, it is evident that the numeral keys will be released on the forward stroke of the handle, which is the end desired. This release is timed to take place during the first part of the forward stroke of the handle and before the racks R50, have begun to move— all of which is done by the change in the location of the cam 63L. The cam 63L, is held in its depressed position, as shown in Fig. 54, by the aforesaid irregular piece L64, which is provided with a stud 25L, extending out from its lower side. This stud 25L, is immediately beneath the lever 58L, (see Fig. 58) and when the total key K63, is depressed, and the pin L19, rides up on the cam on the end of the lever 58L, it carries the stud 25L, downward, and this in turn moves the stud 22L, on the cam 63L, downward and holds the same firmly in this position while the piece D68, moves forward. A second stud similar to the stud 25L, is placed in the piece L64, for engagement by similar parts operated by the total key K66.

*The sub-total key.*—The operation of the handle O58, when either of the total keys is depressed causes the machine to print whatever accumulation has been made upon the respective adding devices and leaves the machine at zero, or the starting point—technically called "clear." It is, however, often desirable to print this amount, but to return the same on the adding wheels on the return stroke of the handle and this operation is known as taking a sub-total. This is accomplished by two keys K64, and K67. The key K64 (see Figs. 58 and 59) is in all respects similar to the total keys K63, and K66. It is provided with the same kind of a latch 56L, which engages a notch "n" on the upper end of the keystem and has a stud L18, in the lower end for engaging a second cam on the upper surface of the piece 58L. A bar L65, similar to and just back of the bar L66, provided with suitable upward extending projections, engages the turned-in lip at the upper end of the latch 56L, in the same manner that the bar L66, engages the upper end of the latch L56. This bar L65, is supported at its rear end by being pivoted to the upper end of a lever L68. The lower end of which lever L68, extends into the path of travel of the inner end of the pivot D14, on the plate D50, in such position that when the pin D14, is at its extreme forward position, as shown in Fig. 59, it is in engagement with the lower end of the lever L68, and causes the bar L65, to move to the rear a sufficient distance to disengage the latch 56L, from the keystem K64.

The operation of taking a sub-total so far as the mechanism is concerned is the same to begin with as for taking a total, but at the forward end of the stroke of the handle O58, the movement of the plate D50, has caused the bar L65, to release the keystem K64. This permits the piece 60L, and L62, to drop to the position shown in Fig. 46, in which position the piece L62, will not engage the lower end of the flying lever D53. Therefore the adding crank A67, will remain in its forward position, as shown in Fig. 59, during the return stroke of the handle O58, and the adding crank A67, is not moved until such time as the pin D13, in the plate D50, engages the forward side of the flying lever D53, and so moves the connecting link D56, as to cause the adding crank A67, to assume its normal position, as shown in Fig. 58. This return stroke of the handle O58 and connected parts becomes in all respects the same as the return stroke when the machine has been performing the regular function of adding. In this way sub-totals are taken.

*Repeat key.*—When it is desired to add any item a number of times in succession, it is usual to provide a means for preventing the operation of the handle O58, from causing the numeral keys to be unlocked, and in this machine this is accomplished in the following manner, (see Figs. 49, 58 and 59:) The repeat key K62, is provided with a notch "*n*" near its upper end the same as the other operating key and a latch L55, pivoted in the side frame B47, serves as a means of holding the repeat key in its depressed position, and at the same time operating the mechanism to prevent the numeral keys from being unlatched. To the lower end of the lever L55, there is pivoted a piece L61, which extends in a rearward direction and is provided with a pin 27L, extending on both sides of the piece L61. On the inside, the pin 27L, engages a tail marked "*v*" extending downward from the cam L63 (see Figs. 52 to 55). On the other side, the pin 27L, slides in a slot on the lower side of the irregular piece L64, which furnishes a guide for the movement of the piece L61. Whenever the latch L55, engages the keystem K62, the piece L61, is moved to the rear and the pin 27L, engages the tail "*v*" on the cam L63, and turns this cam so that the pin L14, on the piece D68, will not engage it, and as a consequence, the three-armed crank L52, will not be rocked and the hook L51, will not cause the numeral keys to be unlatched.

Whenever a total is taken, it is desirable to release the repeat key K62, and this is accomplished in the following manner: The depression of the irregular piece L64, by means of the total key and the lever 58L, causes the end of the piece L61, to come into the path of a pin 17D, on the side of the piece D68, and the forward movement of the piece D68, on the forward movement of the handle O58, causes the piece L61, to swing the latch L55, about its pivot and disengage the repeat key K62.

*The non-add key.*—If it is desired on this machine to print an item which is not a total and which does not affect either of the accumulating devices, a special key K69, called the "non-add key" is provided, which, on being depressed, permits a latch L58, (see Fig. 47) to engage in a small notch near its upper end in the same manner as the latches for the other operating keys before described. This movement of the latching piece L58, causes the rearward end of the same to come into the path of a square rivet 15D, on the side of the piece D58, which prevents the piece D58, from turning to the left, which consequently prevents the pin D21, from swinging out of the path of the hit and miss piece D51, as described in the mechanism for causing addition, and so prevents the flying lever from causing any operation of the adding crank A67. In addition to locking the adding mechanisms in their inoperative positions, the piece L58, engages a projection on the upper side near the rear end of the bar L66. The forward side of this same projection on the bar L66, comes in contact with a pin on the upper end of the lever 50L, which is mounted on the shaft L1, and is connected by a spring 81L, to the piece 51L, (see Fig. 48) a pin 15L, serving as a stop against which the piece 51L, abuts and holds the pieces 50L, and 51L, in relative positions. When the latch L58, of the non-add key K69, engages the notch in the upper end of the keystem K69, and locks the same down, the bar L66, is moved forward and it in turn moves the lever 50L, which causes the shaft L1, to turn slightly to the right, and this in turn unlocks the handle O58, by raising the hook 52O, out of engagement with the plate O50. (See Fig. 40).

*The release key.*—The release key K61, (see Figs. 58 and 59) is the first of the operating keys and the only one which does not lock down. It serves the function of releasing any key depressed whether operating key or numeral key. A pin K11, on the side of the keystem K61, engages a cam L54, pivoted at L17, to the side frame B47. This cam L54, has extending through it a stud L26, which serves as a bearing for the forward end of the sliding bars L65, and L66,— the said bars being provided with a notch at their forward end, as indicated by the dotted lines in Figs. 47, 58, and 59. A third bar similar to the bar L65, and L66, is pivoted to the same stud L26, in the cam L54, and is provided with suitable projections on its upper edge for engaging the latches for holding down the adding keystems K65, and K68, the details of which are not clearly shown in the drawing but their operation is in all respects similar to the operation of the bars L65, and L66, except that the only method of operation is to be found at the forward end on the cam L54. The depression of the key K61, causes the pin K11, to swing the cam L54, in a rearward direction and this moves all of the bars L65, and L66, and the bar for releasing the adding keys to the rear, and so releases the latches for holding these operating keys in their depressed positions. The release of the numeral keys by means of the release key K61, is effected as follows: A toggle lever 57K, extends between the keystem K61, and the stud L12, on the piece L51, as clearly shown in Figs. 49, 58, and 59. When the key K61, is depressed, the action of this toggle lever 57K, is such that the stud L12, moves the piece L51, to the rear and, as before explained, this causes the numeral keys to be released.

It is desirable that the setting of the keys both numeral and operating should not be changed after the handle O58, starts on its forward stroke, and a suitable lock to the keystem K61, is provided at K32, (see Figs. 47, 49, and 5). This lock consists of a round-headed stud which extends through the side frame B47, and is held by a spring in contact with the left-hand key lock 53K. As soon as the handle O58, is moved and the key lock 53K, moves toward the keystem, the release key lock K32, moves to the right and engages a notch in the rear side of the keystem K61,—thus preventing the key K61, from being depressed.

*The automatic paper feed.*—When using this machine for the listing of numbers, it is often desirable to cause the paper to feed automatically by rotating the platen after every item is printed, and this is accomplished in the following manner (reference being had to Figs. 1 and 30 to 38) : As before explained, on the shaft P1, there is a lever P74, having one end extending toward the rear. The normal position of this piece P74, is as shown in Fig. 36. At the forward end of the stroke of the handle O58, it assumes the position shown in Fig. 34. A lever 51E, is suitably pivoted in the machine, and at its forward end has an engaging dog 50E, held in position by the spring 82E. This dog 50E, engages the end of the lever P74, when the handle is pulled to its forward position, as shown in Fig. 34. The return stroke of the handle O58, and the return stroke of the lever P74, move the dog 50E, to the position shown in Fig. 35, and thereby swing the lever 51E, to the position shown in Fig. 35. The rear end of the lever 51E, marked 53E, in the drawing, is connected to a hook 52E, and when the handle O58, is near the end of its return stroke, this hook 52E, is in the depressed position shown in Fig. 35. Further movement of the return stroke of the handle O58, causes a forward extending member of the dog 50E, to engage a stop P34, which causes the dog to disengage from the lever P74, and the spring 80E, returns the lever 51E, and consequently the hook 52E, to the position shown in Fig. 36. This movement of the hook 52E, swings a horizontal bar C54, on the carriage into a lowered position, and suitable mechanism is provided and connected to the bar C54, which causes the feed pawl on the carriage to rotate the platen "S" a suitable distance, thus causing the paper to feed by rotation. The details of the carriage mechanism for causing this rotating feed, not being part of this application, will not be described here.

When it is desired to operate this machine without having the handle automatically rotate the paper feed, a small lever P72, (see Figs 1, 2, 36 and 38) extending over the upper portion of the keyboard, has an arm extending to one side and engaging a pin on the sliding bar P71. This sliding bar P71, is provided at its rear end with an upturned hook which can engage a pin 15E, on the upper end of the dog 50E. If the bar P71, be drawn in a forward direction, the hook on its rear end will move the pin 15E, in a forward direction and so swing the lower end of the dog 50E, out of the path of the lever P74, so that the same will not engage the dog 50E, as it moves, and consequently the hook 52E, will remain in one position, as shown in Fig. 36. Whenever the small slide P67, which cuts off the printing is moved over to the "x" position for performing multiplication or other calculations, or printing is not desired, a stud on the under side of the slide P67, engages a cam on the side of the sliding bar P71, and moves the bar P71, in a forward direction, as is indicated in the detail Fig. 37. The spring 88P, extending between the stud on the side of the sliding bar P71, and the lever P72, maintains the bar P71, in its inoperative position except when the stud on the bottom of the slide P67, or the lever P72, moves the bar P71, to its forward position.

*Ribbon vibrator.*—The printing device on this machine is technically known as a front strike mechanism. This necessitates the raising of the ribbon to cover the printing point at each impression, which should be lowered afterward in order to make the printing visible. This is accomplished by the mechanism shown in the Figs. 30 and 34. A suitable guide 50P, is provided, and a vibrator 51I, is mounted to slide vertically. At its lower end 51I, is in engagement with a lever 52I. Pivoted to the rear end, a link 54I, connects the rear end of a lever 52I, with one end of the bell crank 60I. The other end of the bell crank 60I, is connected by a link 51P, to the lower side of the piece P74,—thus when the handle O58, is moved forward, and the piece P74, turns to the right, the link 51P, moves forward, moving with it the lower extending member of the bell crank 60I, and through the link 54I, lowers the back end of the lever 52I, raising the forward end, and so raising the ribbon vibrator 51I, to cover the printing point.

*The carriage lock.*—Whenever the handle O58, is started on its forward movement, it is desirable to lock the carriage of the machine against lateral movement, in this way preventing the disengagement of the adding machine tabulating stop from its contact point, and connecting adding mechanisms, and this is accomplished by the following mechanism (see Figs. 30 and 34): The carriage is provided with a feed rack of the customary form, marked C59, and a bell crank lever 54E, is, in this case, pivoted to the same pivot with the arm 51E. The upper end of 54E, extends as high as the rack C59, and is of the proper width to engage between the teeth of this rack. The lower end of the lever 54E, is extended forward and has near its forward end a pin 28E, extending outward and over the top of the lever P74. Any suitable spring is connected to the lever 54E, and tends to draw the upper end into engagement with the teeth of the rack C59. When the handle O58, is at rest, the lever P74, engages the pin 28E, and raises the forward end of the lever 54E, thereby disengaging the upper end from the rack C59; but as soon as the handle O58, is started, the lever P74, assumes the position shown in Fig. 34, and leaves the pin 28E, free to descend, thereby permitting the upper end of the lever 54E, to engage the rack C59, and hold the carriage from any lateral movement.

*Typewriting mechanism.* — The typewriting mechanism in this machine consists of a three-piece type movement, which is clearly shown in Figs. 45 and 60. The key lever T68, is in this case a lever of the first class, being pivoted at T94, in a suitably slotted bar T47, which is secured to the base B45. This pivot T94, is at an intermediate position between the key tip at the forward end and the roller T41, at the rear end of the lever T68. This roller T41, engages a cam slot in the lower end of the upright lever T67, which is pivoted in a horizontal slotted bar T48, on the wire T91. The upper end of the lever carries a rivet T17, which engages a slot in the type bar T66—this type bar T66, being pivoted at T92, in a segmental bearing T45—which segmental bearing supports the type guide T75. The depression of a key tip lowers the forward end of the lever T68, and elevates the roller T41. This operates in the cam slot at the lower end of the lever T67, moves the lower end of the lever T67, to the rear, and the rivet T17, at its upper end forward. This movement of the rivet T17, swings the type bar T66, from its position of rest, as shown in Fig. 60, until the type engage the platen "S." The type bars T66, in their position of rest are in contact with a felt strip T97, supported by the dust guard T46. The dust guard is mounted between the side frame B47, on the left-hand side, and the plate P51, of the printing section on the right. The bar T48, for supporting the pivot T91, of the upright levers T67, extends between the side frames B46, and B47, and is secured to them. The levers T68, are held in their normal position with the key tips elevated by the springs T80, extending between the lower side and suitable adjusting screws in the base B45. A felt strip T96, which is within the case, serves as a cushion to limit the upward travel of the levers T68. The length of the lever T67, from the pivot T91, to the rivet T17, will vary as the type bars T66, are placed farther and farther from the center position shown in Fig. 60; and this variation in the length of the upper arm of the lever T67, is equalized by the inclination of the cam slot in the lower end of the lever T67, for engagement with the roller T41. The upright lever T67, engages the universal bar E62, on the downward depression of the keys, and the universal bar is connected to operate an escapement in the usual manner.

Having described my invention, I claim—

1. The combination of accumulator wheels movable frames in which the wheels are mounted, carrying mechanism and means for setting the same, actuators for the accumulators, means directly coöperating with the said movable frames for moving the accumulators to engage and disengage the actuators, and also adapted for directly setting the carrying mechanism when the accumulators engage the actuators.

2. The combination of accumulator wheels movable frames in which the wheels are mounted, carrying mechanism normally in engagement with the accumulator wheels and means for setting the carrying mechanism, actuators for the accumulators, means directly coöperating with the said movable frames for moving the accumulators to engage and disengage the actuators, and also adapted for directly setting the carrying mechanism when the accumulators engage the actuators.

3. In a machine of the kind described, accumulator wheels movable frames in which the wheels are mounted, carrying mechanism and means for setting the same, actuators for the accumulators, means directly coöperating with the said movable frames for moving the accumulators to engage and disengage the actuators, and also adapted for directly setting the carrying mechanism when the accumulators engage the actuators, a driving mechanism, and an operative connection between said driving mechanism and said frame-actuating means.

4. The combination of accumulator wheels movable frames in which the wheels are mounted, carrying mechanism and means for setting the same, racks for actuating the accumulators, cams mounted on a shaft for moving the accumulators to engage and disengage the racks, and means operated by the accumulator moving mechanism for setting the carrying mechanism.

5. The combination of accumulator wheels movable frames in which the wheels are mounted, carrying mechanism and means for setting the same, racks for actuating the accumulators, cams mounted on a shaft for moving the accumulators to engage and disengage the racks, and means operated by the accumulator moving mechanism for setting the carrying mechanism, a driving mechanism and a single connection extending to and operating the accumulators.

6. The combination of accumulator wheels movable frames in which the wheels are mounted, spring actuated carrying mechanism and means for setting the same, actuators for the accumulators, means directly coöperating with the said movable frames for moving the accumulators to engage and disengage the actuators, and also adapted for directly setting the carrying mechanism.

7. The combination of accumulator wheels movable frames in which the wheels are mounted, spring actuated carrying mechanism, normally in engagement with the accumulators, and means for setting the same, racks for actuating the accumulators, means directly coöperating with the said movable frames for moving the accumulators to engage and disengage the racks, and also adapted for directly setting the carrying mechanism.

8. The combination of accumulator wheels movable frames in which the wheels are mounted, spring actuated carrying mechanisms and means for setting the same, racks for actuating the accumulators, means directly coöperating with the said movable frames for moving the accumulators to engage and disengage the racks, and also adapted for directly setting the carrying mechanism when the accumulators engage the racks, a driving mechanism, and an operative connection between said driving mechanism and said frame-actuating means.

9. The combination of accumulator wheels movable frames in which the wheels are mounted, spring actuated carrying mechanisms and means for setting the same, racks for actuating the accumulators, cams mounted on a shaft for moving the accumulators to engage and disengage the racks, and means operated by the accumulator moving mechanism for setting the carrying mechanism.

10. The combination of accumulator wheels movable frames in which the wheels are mounted, carrying mechanism and means for setting the same, actuators for the accumulators, means for moving the accumulators to engage and disengage the actuators, and a swinging bar operated by the accumulator moving mechanism for setting the carrying mechanism.

11. The combination of accumulator wheels movable frames in which the wheels are mounted, carrying mechanisms normally in engagement with the accumulators and means for setting the same, racks for actuating the accumulators, means for moving the accumulators to engage and disengage the racks, and a swinging bar operated by the accumulator moving mechanism for setting the carrying mechanisms.

12. The combination of accumulator wheels movable frames in which the wheels are mounted, spring actuated carrying mechanism, racks for actuating the accumulators and means for moving the accumulators to engage and disengage the racks, a swinging bar for setting the carrying mechanism, and means operated by the accumulator moving mechanism for causing the swinging bar to set the carrying mechanisms when the accumulators engage the racks, a driving mechanism and a single connection between the adding mechanism and the driving mechanism.

13. The combination of accumulator wheels a movable frame in which the wheels are mounted, carrying devices normally in engagement with the accumulator, restoring mechanism for the carrying device connected to be operated by the wheel frame when the wheels are disengaged from the carrying device.

14. In a key-set adding machine, the combination with a movable carriage, and a platen carried thereby, of printing mechanism, keys for setting the numbers of the printing mechanism, operating means adapted to cause the printing mechanism to print such numbers as have been set by the keys, and means for locking the operating means so that it cannot actuate the printing mechanism when the carriage has passed in either direction beyond the limits between which the printing mechanism is designed to strike the platen.

15. In a key-set calculating machine, the combination with a movable carriage, of printing means, operating means for causing the printing means to print from so much thereof as has been set, a locking device for said operating means, keys for setting the printing mechanism, a controlling key for releasing said locking device, and means operated by the carriage adapted to prevent operation of the operating means when the carriage has passed beyond predetermined limits of travel.

16. In a key-set calculating machine, the combination with a movable carriage, of printing means, operating means for causing the printing means to print from so much thereof as has been set, a locking device for said operating means, keys for setting the printing mechanism, a controlling key for releasing said locking device, and a separate locking device for said operating means which is automatically thrown into locking relation to the operating means when the carriage has passed beyond predetermined limits of travel.

17. In a calculating machine, the combination with a movable carriage, of adding mechanism, printing mechanism, means for normally locking the printing and adding mechanisms, means for automatically releasing the said locking means when the carriage is in a predetermined position, and manually operable means for releasing the said locking means when the carriage is in any printing position.

18. In a calculating machine, the combination with a movable carriage, of an accumulator, an actuator therefor, printing mechanism, means for normally locking the accumulator and the printing mechanism, means for automatically releasing the said locking means when the carriage is in a predetermined position, and a total key for releasing the said locking means when the carriage is in any printing position.

19. In a calculating machine, the combination with a movable carriage, of an accumulator, an actuator therefor, printing mechanism, means for normally locking the accumulator and the printing mechanism, means for automatically releasing the said locking means when the carriage is in a predetermined position, and a sub-total key for releasing the said locking means when the carriage is in any printing position.

20. In a calculating machine, the combination with an accumulator, and normally locked operating means therefor, of a movable carriage, a controlling key, and means common to both the carriage and the controlling key by which the operating means may be manually unlocked by the said key, or, automatically unlocked by the carriage when the latter is in a predetermined position.

21. The combination in an adding machine of a number printing device, accumulators and actuators connected to operate the accumulators, means for causing the accumulators to engage and disengage the actuators, a non-add key and a latch coöperating therewith adapted for locking it in its depressed position, mechanisms operated by the said latch for preventing the accumulators from engaging the actuators.

22. The combination in an adding machine of a number printing device, accumulators normally disconnected for operations of calculation, actuators adapted to operate the same, means for causing the accumulators to engage and disengage the actuators, a non-add key and a latch coöperating therewith adapted for locking it in its depressed position, and mechanism operated by the said latch for preventing the accumulators from engaging the actuators.

23. The combination in an adding machine of accumulators, a number printing device, actuators adapted to operate the adding and number printing devices, and means for causing the accumulators to engage the actuators when adding, a total key and a latch for holding the total key when depressed, and means connected to be operated by said latch for causing the printing device to print totals.

24. The combination in an adding machine of a number printing device, keys for setting the number printing device, actuators controlled by the keys, means for operating the adding machine, an accumulator which is normally disconnected from the actuators for purposes of calculation, a movable carriage, and a tabulating key the depression of which will cause the carriage to assume tabulating position and the accumulator to become operatively connected to the actuators for the purpose of accumulation.

25. The combination in an adding machine of a number printing device, keys for setting the number printing device, actuators controlled by the keys, means for operating the machine, an accumulator which is normally disconnected from the actuators for purposes of calculation, a special key for causing accumulation, a latch for retaining said key in its depressed position, and mechanisms connected to be operated by said latch for causing the accumulator to become operatively connected to the actuators for purposes of accumulation.

26. The combination in an adding machine of a number printing device, keys for setting the number printing device, accumulators and a total key for causing the accumulators to set their totals on the number printing device, a latch for holding the total key in its depressed position, and means connected to be operated by said latch for causing the accumulators to become operatively connected to the printing mechanism for the purpose of printing totals.

27. The combination in an adding machine of a number printing mechanism, and normally locked means for operating the same, a keyboard for the setting of the number printing mechanism, a laterally traveling carriage, and means for operating the same, means for detaining the carriage in any desired position in its lateral travel, key controlled actuators, an accumulator normally disconnected from the actuators for purposes of calculation, and means operated by the carriage whereby the operating means will be unlocked and the accumulator will become engaged with the actuators, to be operated by the operating means for accumulation when the carriage is in the proper predetermined lateral position to cause the printing to tabulate.

28. The combination in an adding machine of a number printing device, a laterally traveling carriage, actuators, a series of accumulator wheels—one for each denomination—normally disconnected from the actuators for purposes of calculation, and means operated by the carriage whereby the operating means is unlocked and an entire series of accumulators are brought into engagement with the actuators whenever the carriage is in the proper predetermined position to cause the printing to tabulate.

29. The combination in an adding machine of a number printing device, a keyboard for setting the number printing device, means for operating the number printing device, said means being normally locked, a laterally traveling carriage and means for operating the same, means for detaining the carriage in any desired lateral position, key controlled actuators, an accumulator normally disconnected from the actuators for purposes of calculation, and means connected to be operated by the carriage whereby the accumulator will become engaged with the actuators for accumulation and the operating means will become unlocked when the carriage is in the proper lateral position to cause the printing to tabulate.

30. The combination in an adding machine of a number printing mechanism, a handle for operating the same, which handle is normally locked, a laterally traveling carriage and means for operating the same, means for detaining the carriage in any desired lateral position, key controlled actuators, an accumulator normally disengaged from the actuators for purposes of calculation, and means connected to be operated by the carriage whereby the accumulator will become engaged with the actuators for accumulation and the handle will be unlocked when the carriage is in the proper lateral position to cause the printing to tabulate.

31. The combination in a calculating machine, of a number printing mechanism, an accumulator mechanism normally disconnected for purposes of calculation, and normally locked operating means therefor, of a traveling carriage, and means actuated by the carriage when it is in a predetermined position, adapted for unlocking the operating means and causing the accumulator mechanism to become engaged for the purpose of calculation.

32. The combination in an adding machine of a number printing mechanism, accumulators normally disconnected for purposes of calculation and normally locked operating means therefor, of a laterally movable carriage, an adjustable stop mounted on the carriage, a contact device for coöperating with the stop and means operated by the contact device for unlocking the operating means and simultaneously bringing an entire set of accumulators into engagement for the purpose of calculation whenever the stop engages the contact device.

33. The combination in an adding machine of a number printing device, key-operated means for setting the number printing device, a normally locked handle for operating the number printing device, key-controlled actuators, accumulators normally disconnected from the actuators for the purpose of calculation, a laterally movable carriage and means for operating the same, an adjustable stop mounted on the carriage, and a contact device for coöperating with the stop, and means operated by the contact device for unlocking the handle and simultaneously bringing an entire set of accumulators into engagement with the actuators for calculation.

34. The combination in an adding machine of a number printing device, a keyboard for setting the number printing device, and a handle for operating the same, which handle is normally locked, a laterally movable carriage, an adjustable stop mounted on said carriage, and a contact device for coöperating with said stop, and means connected to be operated by said contact device for unlocking the handle whenever the carriage stop engages the contact device.

35. The combination in an adding machine of a number printing mechanism, key-operated means for setting the number printing device, actuators, accumulators normally disconnected from the actuators for purposes of calculation, a laterally traveling carriage provided with a stop, a contact device for engaging the stop, a tabulating key for releasing the carriage and permitting the same to move until the stop thereon comes in engagement with the contact device, and means actuated by the contact device for causing the accumulators to become connected to the actuators for the purpose of calculation.

36. The combination in an adding machine of a number printing device, key-operated means for setting the number printing device, actuators, accumulators normally disconnected from the actuators for purpose of calculation, a laterally movable carriage and means for operating the same, an adjustable stop mounted on the carriage, a contact device for coöperating with the stop, a tabulating key for releasing the carriage and permitting it to move until the same comes to rest with the stop in engagement with the contact device, and means operated by the contact device for simultaneously bringing an entire set of accumulators into engagement with the actuators for the purpose of accumulation.

37. The combination in an adding machine of a number printing device, key-operated means for setting the number printing device, a handle for operating the same, the handle being normally locked, actuators, accumulators normally disconnected from the actuators for purpose of calculation, a laterally movable carriage and means for operating same, an adjustable stop mounted on the carriage, a contact device for coöperating with the stop, a tabulating key for releasing the carriage and permitting it to move until the same comes to rest with the stop in engagement with the contact device, and means operated by the contact device for simultaneously bringing an entire set of accumulators into engagement with the actuators for the purpose of accumulation and unlocking the handle.

38. The combination in an adding machine of a number printing device, a keyboard for setting and a handle for operating the same—the handle being normally locked—a laterally movable carriage, an adjustable stop mounted on the carriage, a contact device for coöperating with the stop on the carriage, a tabulating key for releasing the carriage and permitting it to move until the same comes to rest with the stop in engagement with the contact device, and means connected to be operated by the contact device for unlocking the handle, when the carriage is in the tabulating position.

39. The combination in an adding machine of actuators, two springs for operating each actuator, one spring being normally under tension while the other is relatively relaxed, operative means connected to the springs whereby in moving the actuator the relaxed spring is put under tension and the spring under tension is relaxed.

40. The combination in an adding machine of movable actuators, a constant tension device for moving the actuators, consisting of a plurality of springs, some being relaxed and others under strain or tension, and means for moving the racks whereby the springs under tension are relaxed and the relaxed springs are put under tension.

41. The combination in an adding machine of means for operating the same, of accumulators and actuators for actuating the accumulators, locks for holding the actuators in their inoperative position, a key-operated means for limiting the travel of the actuators, and means operated by keys for setting the rack locks so they will be adapted for release from the operating means.

42. The combination in an adding machine of a handle for operating the same, of accumulators, and racks for actuating the accumulators, locks for holding the racks in their inoperative position, a keyboard provided with keys having stops on their stems for limiting the travel of the racks, and means operated by the keyboard for setting the rack locks so they will be adapted for release from the handle.

43. The combination in an adding machine of a handle for operating the same, accumulators, and racks for actuating the accumulators, locks for holding the racks in their inoperative positions, a keyboard having keys and stops—the stops being set by the depression of the keys—for limiting the travel of the racks, and means operated by the keyboard for setting the rack locks so they will be adapted for release from the handle.

44. The combination in an adding machine of a handle for operating the same, accumulators, racks for actuating the accumulators, locks for holding the racks in their inoperative positions, a keyboard having keys and latches for holding the keys in their depressed position, stops operated by the keys for limiting the travel of the racks, and means operated by the latches for setting the rack locks so they will be adapted for release from the handle.

45. The combination in an adding machine of a handle for operating the same, accumulators, and racks for actuating the accumulators, locks for holding the racks in their inoperative position, a keyboard provided with keys and stops set by the keys for limiting the travel of the racks, latches for holding the keys in their depressed position, and locks for holding the keys not depressed in their upper position, means operated by the latches for setting the rack locks so they will be caused to release the racks when the handle starts on its forward stroke.

46. In a calculating machine, the combination with an actuator, of a movable key, a spring-actuated key lock or latch, and a spring operated actuator lock whose tension is less than that of the key lock or latch and which is controlled by the key lock or latch.

47. In a calculating machine, the combination with an actuator, of a movable key, a key lock for preventing depression of the key, a key latch for holding the key when the latter is depressed, and an actuator lock subject to the joint control of the key lock and key latch.

48. In a calculating machine, the combination with an actuator, of a movable key, a spring actuated key lock for preventing depression of the key, a spring-actuated key latch for holding the key when the latter is depressed, and a spring operated actuator lock whose spring tension is less than that of the key lock and key latch and which is controlled by said key lock and key latch.

49. In a calculating machine, the combination with a normally locked actuator, of a numeral key, and locking means coöperating with the key and actuator whereby partial movement of the key without locking the key maintains the normal locked condition of the said locking means and prevents release of the actuator.

50. In a calculating machine, the combination with an actuator, of a movable key, locking means coöperating with the key and actuator, and an interfering device on the key which is adapted to block the movement of said locking means and thereby prevent the unlocking of the actuator when the key is only partially depressed.

51. In a calculating machine, the combination with operating means therefor, of a repeat key, a total key, and mechanism controlled by the total key which will cause the repeat key to be restored when a total is taken.

52. In a calculating machine, the combination with operating means therefor, of a repeat key, a latch therefor, a total key, and means controlled by the total key for setting the said latch to coöperate with the operating means, whereby the repeat key is automatically released when a total is taken.

53. In an adding and listing machine, operating means therefor, a carriage for holding paper, automatic paper line space feed mechanism controlled by the operating means, and a settable cut-out device independent of the operating means which connects and disconnects the space feed mechanism to the operating means to render the space feed mechanism operative or inoperative at will.

54. In a calculating machine, the combination with an order plate having slots, of stop devices secured in said slots, keys slidable through the stop devices, and means on the keys adapted to engage the stop devices.

55. In a calculating machine, the combination with an order plate having slots, of stop devices secured in said slots, keys slidable through the stop devices, and cushioned means interposed between said stop devices and said keys.

56. In a calculating machine, the combination of a number printing device, means for setting the number printing device to adapt it to print, normally locked operating means, a plurality of devices for determining the respective printing operations the machine shall perform, and an operative connection common to the respective plurality of devices aforesaid adapted, on the operation of any one of them, to unlock the operating means.

57. In a calculating machine, the combination with an operating device therefor; of a normally locked locking device for preventing the operation of the operating device, a total key, a sub-total key, and means common to said keys whereby either of said keys is adapted, when operated, to release the locking device aforesaid.

58. In a calculating machine, the combination with a pivoted frame, and accumulating mechanism carried thereby, of carrying mechanism extraneous to said frame, and releasable retaining mechanism carried by the frame whose point of engagement with the carrying mechanism is substantially at the pivotal point of said frame.

59. In a calculating machine, the combination with a pivoted frame, and accumulating mechanism carried thereby, of carrying mechanism extraneous to said frame, and releasable retaining mechanism carried by the frame whose point of engagement with the carrying mechanism is substantially at the pivotal point of said frame, said accumulating mechanism and retaining mechanism being adapted to coöperate with each other.

60. In a calculating machine, the combination with a movable frame, and accumulator wheels carried thereby, the carrying mechanism being extraneous to said frame with which said wheels are normally in engagement, restoring means for said carrying mechanism, and means for operating the movable frame and restoring means, one from the other, to cause operation of the restoring means when the accumulator wheels and carrying mechanism are disengaged from each other.

61. In a calculating machine, the combination with a movable frame, and accumulator wheels carried thereby, the carrying mechanism being extraneous to said frame with which said wheels are normally in engagement, restoring means for said carrying mechanism, and a cam engaged with the frame and the restoring means and adapted to shift the frame to bring the accumulator wheels into and out of engagement with the carrying mechanism and to cause operation of the restoring means on the carrying mechanism when the accumulator wheels and carrying mechanism are disengaged from each other.

62. In a calculating machine, the combination with a movable frame, and accumulator wheels carried thereby, of carrying mechanism extraneous to said frame with which said wheels are normally in engagement, a pivoted restoring bar, a cam for shifting the frame, a toggle-cam pivoted to the restoring bar and adapted to coöperate with the cam first named, and a retaining latch adapted to coöperate with the cam and with the toggle-cam.

63. In a calculating machine, the combination with an actuator, of a slidable carrying device independent of the actuator, an accumulator coöperating with the actuator and the carrying device at different times, a slidable trip latch coöperating with the accumulator and with the carrying device, and a restoring device adapted to retain the carrying device until the accumulator has engaged the actuator or disengaged itself therefrom, and has returned to normal position and thereupon to permit the release and operation of the carrying device.

64. In a calculating machine, the combination with an actuator, of a carrying device independent of the actuator and consisting of a shiftable spring-actuated transfer member and an independent shiftable spring-actuated master member adapted for coöperation with each other, the transfer member being controlled by the master member, a shiftable accumulator adapted to coöperate with the actuator and the transfer member at different times, a trip latch operable by the accumulator and adapted for releasably retaining the master member, and a restoring device adapted to retain the master member until the accumulator has engaged the actuator, disengaged itself therefrom and returned to normal position, and thereupon to permit the release and operation of the carrying device aforesaid.

65. In a calculating machine, the combination with an actuator, of a carrying device independent of the actuator and consisting of a shiftable spring-actuated transfer member and an independent shiftable spring-actuated master member having lost motion means adapted to permit a certain degree of movement of the master member without coöperation with the transfer member, the transfer member being subject to the control of the master member, a shiftable accumulator adapted to coöperate with the actuator and the transfer member at different times, a trip latch operable by the accumulator for releasably retaining the master member, a restoring device, and actuating means coöperating with said restoring device and timed and operating so that the restoring device is adapted to retain the master member until the accumulator has engaged the actuator, disengaged itself therefrom, and returned to normal position, and thereupon to release the master member if it has been unlatched and to permit its lost motion device to shift the transfer member and effect "carrying" on the accumulator, said restoring device being adapted to impactively re-set the master member, if unlatched.

66. The combination in an adding machine, of a number printing device, an accumulator, an accumulator controller, actuators adapted to operate the accumulator, a locking device for the accumulator controller, means for causing the accumulator to engage and disengage the actuators, and non-add means adapted for operation to set the locking device to prevent the accumulator from engaging the actuators for purposes of addition.

67. The combination in an adding machine, of a number printing device, a plurality of accumulators, actuators, means for causing the accumulators to individually or jointly engage and disengage the actuators, and non-add means adapted for operation to prevent all of the accumulators from engaging the actuators for purposes of addition.

68. In an adding machine, the combination with an accumulator, of an accumulator controller, actuators adapted to be engaged by or disengaged from the accumulator, a latch adapted to lock the accumulator controller, an operation controlling device adapted to release the latch so that the accumulator controller will permit addition to be performed, a non-add device, and a latch controlled by the non-add device which is adapted to lock the accumulator controller.

69. In an adding machine, the combination with a plurality of accumulators, of a plurality of accumulator controllers, actuators adapted to be engaged by or disengaged from the accumulator, independent latches for locking the respective accumulator controllers, independent operation controlling devices for determining the engagement of the respective accumulators with the actuators and which are adapted for operating the respective latches aforesaid, another latch adapted to lock all of the accumulator controllers independently of the locking action thereon by the aforesaid latches, and a non-add device controlling the locking latch last-named.

HALCOLM ELLIS.

Witnesses:
ADOLPHE L. BOYCE,
EDGAR A. MOREE.